(12) United States Patent
Ramalingam et al.

(10) Patent No.: US 10,560,344 B1
(45) Date of Patent: Feb. 11, 2020

(54) PAGE PREFETCHING

(71) Applicant: Amazon Technologies, Inc., Seattle, WA (US)

(72) Inventors: Harsha Ramalingam, Kirkland, WA (US); Christopher Philip Worland, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 15/688,748

(22) Filed: Aug. 28, 2017

Related U.S. Application Data

(63) Continuation of application No. 13/764,727, filed on Feb. 11, 2013, now Pat. No. 9,769,030.

(51) Int. Cl.
*G06F 3/048* (2013.01)
*H04L 12/24* (2006.01)

(52) U.S. Cl.
CPC .................... *H04L 41/22* (2013.01)

(58) Field of Classification Search
CPC .. H04L 67/02; H04L 67/2847; G06F 12/0862
See application file for complete search history.

(56) References Cited

U.S. PATENT DOCUMENTS

| | | | |
|---|---|---|---|
| 8,849,942 B1 * | 9/2014 | Foster | G06F 12/0862 709/213 |
| 2006/0047804 A1 * | 3/2006 | Fredricksen | G06F 16/954 709/224 |
| 2006/0101514 A1 * | 5/2006 | Milener | G06F 21/51 726/22 |
| 2013/0086490 A1 * | 4/2013 | Roskind | G06F 3/04842 715/760 |

\* cited by examiner

*Primary Examiner* — Phuong H Nguyen
(74) *Attorney, Agent, or Firm* — Thorpe North & Western, LLP.

(57) ABSTRACT

A method for optimizing resource prefetch criteria may include identifying a prefetch criteria for a selectable item, the first prefetch criteria being associated with the selectable item. The first prefetch criteria may be modified to a second prefetch criteria different from the first prefetch criteria, where the modification includes a change of shape of a prefetch area from a first shape to a second shape different from the first shape. The first prefetch criteria may be replaced with the second prefetch criteria.

20 Claims, 21 Drawing Sheets

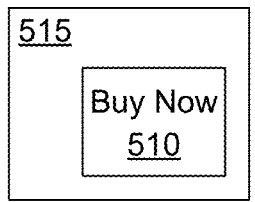
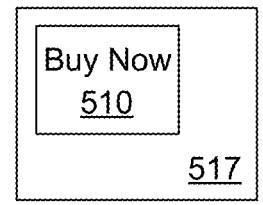
FIG. 5a    FIG. 5b
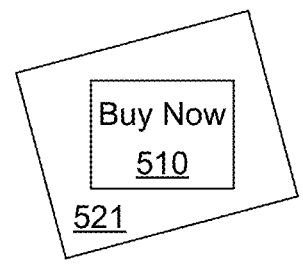
FIG. 5c    FIG. 5d
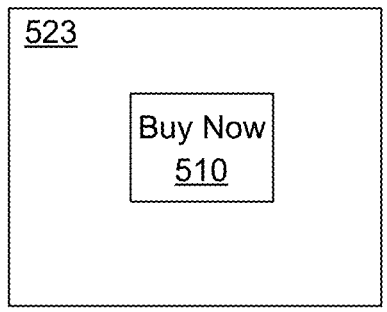
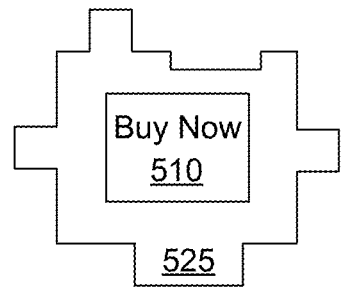
FIG. 5e    FIG. 5f

PAGE PREFETCHING

RELATED APPLICATIONS

This application is a continuation of U.S. patent application Ser. No. 13/764,727, filed on Feb. 11, 2013.

BACKGROUND

Computing devices and communication networks may be utilized to exchange information. In a computing application, a computing device may request content from another computing device via the communication network. For example, a user at a personal computing device may utilize a browser application to request a network page from a server computing device via the Internet. In such embodiments, the user computing device may be referred to as a client computing device and the server computing device may be referred to as a content provider.

From the perspective of a user utilizing a client device, a user experience may be described at least partially in terms of the performance and latencies associated with obtaining network content over a communication network, such as obtaining a network page, processing embedded resource identifiers, generating requests to obtain embedded resources, and rendering content on the client computing device. Latencies and performance limitations of the above processes may diminish the user experience. Additionally, latencies and inefficiencies may be particularly apparent on computing devices with limited resources, such as limited processing power, limited memory or limited network connectivity such as netbooks, tablets, smartphones, and the like.

BRIEF DESCRIPTION OF THE DRAWINGS

FIGS. 5*a*-5*f* illustrate potential modifications to a prefetch area with respect to a link for optimizing the prefetch area in accordance with examples of the present technology.

DETAILED DESCRIPTION

Figure 1:
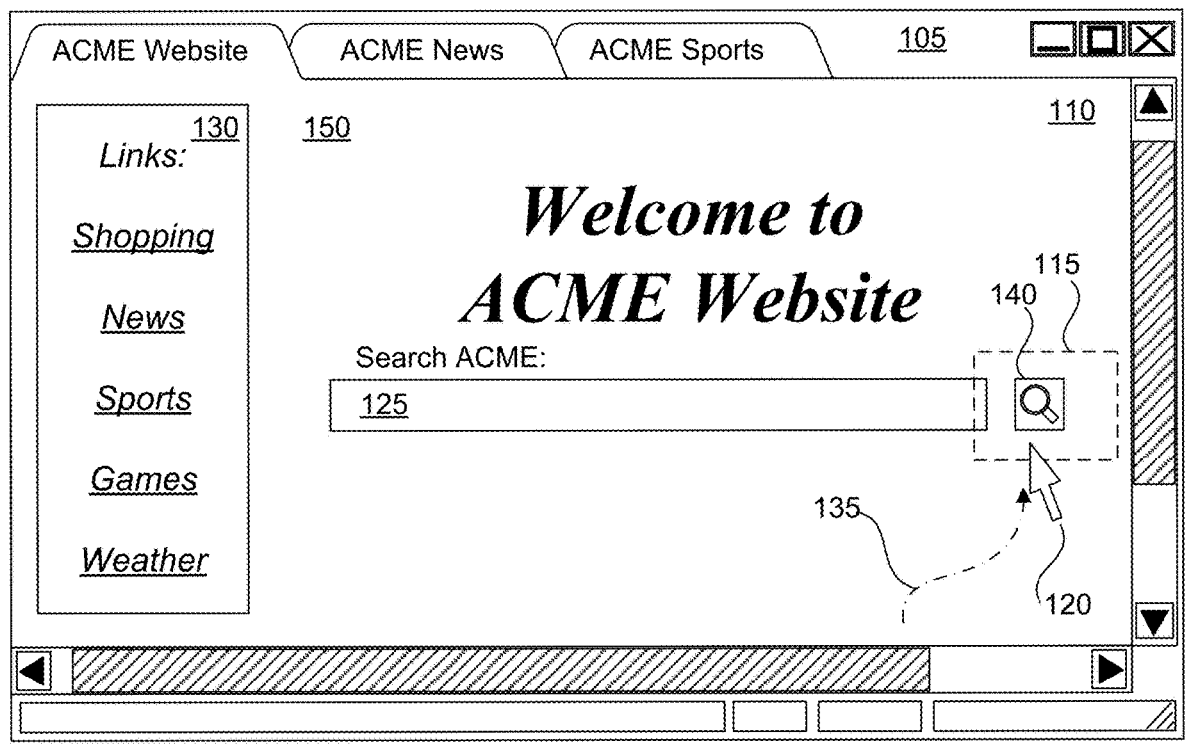
FIG. 1 is an illustration of a browser in which cursor movements are tracked in accordance with an example of the present technology.

A technology is provided for optimizing page prefetch areas. An example method in accordance with the present technology may include identifying or defining a prefetch area on a page. The prefetch area may be associated with a probability representing whether a linked page or resource in the page may be requested. The probability may be based on factors such as user interaction with the page relative to the prefetch area. The prefetch area may be modified in any of a number of different ways to a modified prefetch area different from the prefetch area. Requests for the linked page may be tracked by considering the user interaction relative to the modified prefetch area to obtain a modified probability that the linked page may be requested. The prefetch area may be replaced with the modified prefetch area when the modified probability is greater than the probability. In other words, if the user interaction with respect to the modified prefetch area indicates a greater likelihood that the linked page may be requested, then the modified prefetch area may be used in place of the pre-modified prefetch area. The modified prefetch area may be tested with a group of users or on a set of pages before being implemented on a wider scale and replacing the prefetch area when the modified probability is greater than the probability.

In one example, a network page (e.g., a web page or first resource) may have one or more links (i.e., hyperlinks) to linked pages (e.g., additional web page(s) or second resource(s)). Loading the linked pages across a network commonly involves network transfer and processing of the network page data. As a result, the latency of loading may be high. Prefetching the linked pages may reduce the latency for a user who selects a linked page for viewing. However, prefetching of every linked page may be excessive and burdensome on servers and client devices. Interpreting which user interactions with the network page are more likely to result in requests for specific linked pages may be useful in optimizing which linked pages to prefetch before a user request is actually made. The ability to prioritize prefetching may reduce latency. Defining prefetch areas on the page and tracking user interactions with respect to the prefetch areas and requests for the linked pages may be useful in the interpretation of user intent and increasing the efficiency and speed of navigation between pages. Making modifications to the prefetch areas in terms of size, shape, orientation, positioning on the page and so forth may be useful in determining whether modifications to the prefetch areas provide improvements to latency over existing prefetch areas. Such modifications may be tested on a small scale or rather on a subset of a population of users visiting the network page to determine the effect of the modifications on prefetch accuracy before implementing the modifications to the full population of users.

Improvements may be made to a detection area used in prefetching that has been manually or automatically configured in order to determine when to prefetch a next page. The area may be optimized to provide the best customer experience with the least amount of calculation overhead. Because a manual approach may not perform well or at all in the future if the layout of the page changes, machine learning may be leveraged to split customers into segments (e.g., test segment and non-test segment; multiple test segments and an individual non-test segment; etc.), and expose different groups of customers to different prefetch parameters. These parameters may be manifested as slightly mutated detection rectangles of different sizes and offsets. Based on the prefetch success of the best segments, the system may automatically optimize the parameters used to detect customer's intent and handle future changes in page layout automatically.

Referring to FIG. 1, a browser application 105 is illustrated, by way of example, which is configured to load and display pages 150 or content within pages, such as content in web pages accessible locally or over a network connection. The browser application 105 may provide a user interface and may display content in a browsing session. The browser application 105 may have a content display area 110, as well as one or more one or more local interface components. The local interface components may include toolbars, menus, buttons, address bars, scroll bars, window resize controls, or any other suitable user interface controls. Local interface components may be displayed as separate from the content display area 110 or may be overlaid or embedded in the content display area 110. The content display area 110 may display interactive controls and other components alongside the content items. The content displayed in FIG. 1 includes a list of links 130 that the user may activate to navigate to linked web pages and a search interface 125.

In the example shown in FIG. 1, various links 130 are included in the page 150, including links to predefined linked pages as well as a link 140 to a page defined by user input in the form of a search query. The page 150 may include a tracking region 115 in which user interactions with the page may be tracked. User interactions within the tracking region 115 may be indicative of future interactions with the page, such as selection of links to request linked pages. The tracking region 115 may be defined as a portion of the page less than the full page, such as an area surrounding a search request link 140. Tracking information for the tracking region 115 may be collected remotely from the user interaction, such as at a server hosting the page 150 delivered to a client device where the user interaction occurs. In another example, tracking of the user interaction within the tracking region 115 may be performed locally on the client device, such as via the browser application 105 or any other suitable tracking application.

In the example illustrated, a cursor 120, such as a mouse or track-pad controlled pointer, may be moved within the tracking region 115. The movement 135 of the cursor 120 may represent the user interaction. Such movement 135 of the cursor 120 by the user may be what is tracked within the tracking region 115. Various types of user interactions other than movement of a cursor 120 are also contemplated including selection (e.g., mouse clicks) and focus events. Some non-limiting examples of other user interactions with the page may include vocal interactions, motion of the user or a part of the user relative to the client device or a device in communication with the client device, single or multi-touch operations on a touch sensitive surface, manipulation of keyboard or other hardware controls (including, for example, pressing a key or button without releasing the key or button) and so forth. Within the user interaction, specific interactions, such as swiping, zooming, panning, scrolling and other motions may be used for predicting prefetches. As a specific example of another type of user interaction, a client device may include a camera and eye tracking software for tracking movement of eyes relative to a displayed page on the client device.

For simplicity in explanation and illustration, many of the examples provided herein describe user interaction with the page 150 in terms of movement 135 of a cursor 120 relative to the page 150. FIG. 1 illustrates a cursor 120 and a movement path representing movement 135 of the cursor over a short duration of time. Various aspects of the cursor movement may be tracked, such as, but not limited to, trajectory of movement, velocity of movement, acceleration during movement, hold time at any individual position along the movement path and position of the cursor relative to the page. Aspects such as hold time, velocity and so forth may involve the use of a clock 145 or other timing device on the local client or on a remote server.

Monitoring user interactions and experimenting with variations on predictions of which user interactions with a pre-fetch area are more likely to result in a request for a page or other network resource may assist in optimizing prefetches and/or prefetch areas for reduced latency.

While this example and others described later are described primarily in terms of network pages, the technology may be applied to any type of page or network resource which may be requested and for which reduced latency is desired. For example, a resource may include a page, a video clip, an audio clip, an image, a text document or any other suitable type or configuration of resource which may be requested or from which a request may be made.

Figure 2:
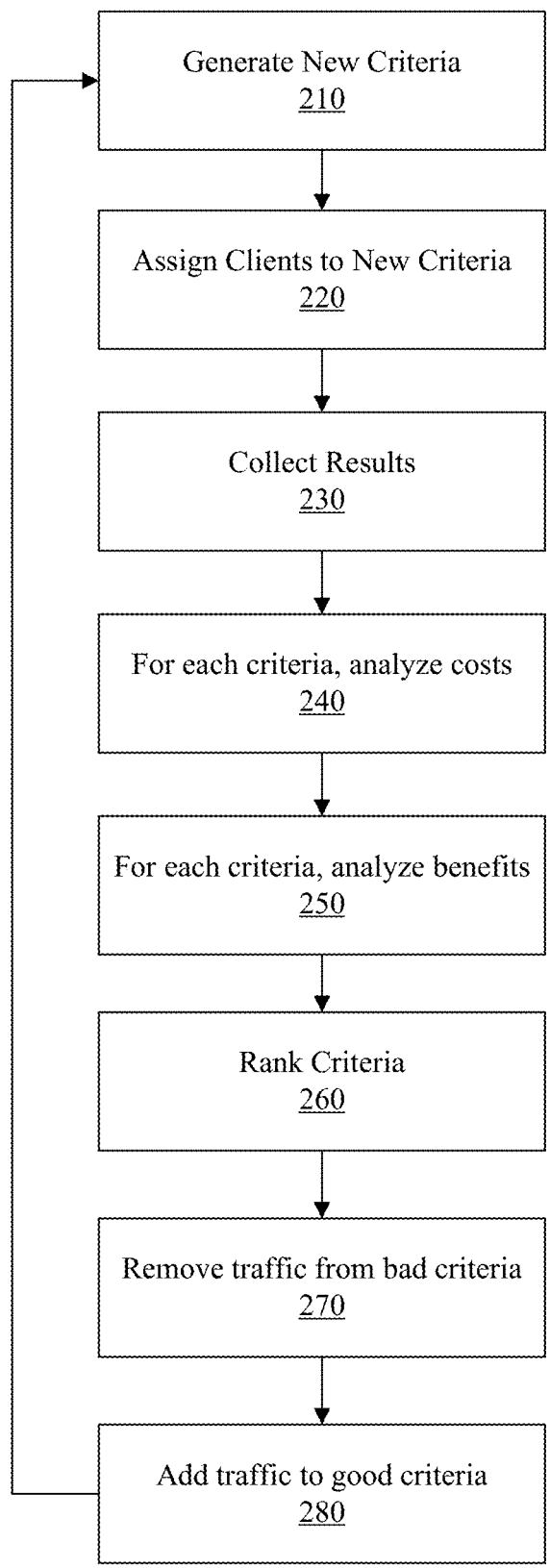
FIG. 2 is a flow diagram illustrating a prefetch optimization method in accordance with an example of the present technology.

With reference to FIG. 2, a prefetch optimization method is illustrated in accordance with an example of the present technology. The method in this example may begin by generating 210 prefetch criteria. Prefetch criteria may be defined by a set of prefetch parameters or prefetch settings. In other words, prefetch criteria may represent a group of individual prefetch parameters or settings. For example, prefetch settings may define prefetch areas for a page. Some other non-limiting examples of prefetch settings may include: timing of user interaction, actions resulting in a user viewing a current network page, user interactions with the network page, pixels or other display units or display areas used as identifiers or boundaries for prefetching and so forth. Various parameters may include display areas (size, shape, number of areas, etc.), irregular shape parameters, user interaction speed, user interaction direction (e.g., direction of movement of a cursor), sensor settings for detecting user interaction, a resource lifetime for expiring a prefetched resource, a maximum number of times a resource may be prefetched, and any suitable user behavior or interaction definable by parameters. Any of the parameters may be modified and tested for optimization by the system according to predefined modification rules or by random modification. Prefetch criteria may include multiple prefetch settings, such as prefetch area parameters and user interaction parameters, for example.

Where prefetch criteria for a page already exist, the method may alternately begin by testing the existing criteria or modifying the existing criteria. Client devices may be assigned 220 to the new criteria as a test group for testing the effectiveness of the new prefetch criteria. Any number of different criteria may be tested for any number of different groups of clients, and the groups may be of varying sizes. Client devices selected for testing may optionally include fewer than a total number of client devices accessing a page. In other words, a subset of a population of devices may be subjected to testing of the new or revised prefetch criteria.

Results of the testing may be collected 230. The results may be analyzed for each prefetch criteria tested to identify costs 240 and benefits 250 of the criteria. For example, costs may include increased processing resources, instances of unnecessary prefetching, increased latency and so forth. Benefits may include decreased usage of processing resources, a decrease in latency and so forth. The different criteria tested may be compared and ranked 260 against one another to determine which settings are useful, or effective at reducing latency while minimizing false or unnecessary prefetching that may otherwise negatively impact dependent services, as well as to determine which settings are not useful, or not effective at reducing latency or minimizing false prefetching.

Traffic directed to the not useful or "bad" settings may be removed 270, or rather directed toward different criteria, which may be criteria of a known acceptable quality or may be new prefetch criteria for testing. For example, the traffic directed to the "bad" criteria may be added 280 to a page using "good" criteria. For example, the useful or "good" criteria may include newly tested criteria or may include known useful or "good" criteria from before testing was begun.

The cycle illustrated in FIG. 2 may begin again by providing additional new criteria that may be generated 210, which may be used for additional testing. The same or a different (sub)set of clients may be assigned 220 to the new criteria and the process may be repeated. Alternately, where multiple criteria tested in a testing iteration proved to be acceptable, clients may be redistributed among the multiple criteria to narrow the multiple criteria to fewer better performing settings. Also, a combination of testing new criteria with one or more criteria from previous iterations may be performed.

A prefetch system may be adapted to perform the optimization method illustrated in FIG. 2. In addition, the method may include performance of other operations for prefetching pages based on the optimized prefetch areas. For example, the method may include retrieving and processing a network resource from a network computing device such as a server, for example, prior to the indication of a request for the network resource (e.g., network page or web page) by a client computing device. For example, the retrieval and processing of the network resource may include identifying a network page likely to be requested by a user, retrieving the network page and causing at least a portion of the network page to be loaded at the client computing device over a network.

In one configuration, embedded or linked resources associated with the network resource may be prioritized such that the retrieval and processing of the prioritized embedded resource(s) occurs in response to a determination that the network resource(s) are more likely to be requested. For example, a user of a client device may initiate movement of a cursor toward a link on a page. In response, the method may include initiation of retrieval of one or more prioritized resources associated with the linked page in anticipation of user activation of the link (e.g., "clicking" on the link using the cursor).

The method may include a monitoring the movement of the cursor. The method may include timing aspects of movement of the cursor or cursor function, such as a hold time of a cursor remaining in a same position or within a defined area relative to the page. In addition, the time elapsed between cursor movement from one position relative to the page to another position of the cursor relative to the page may be tracked.

The method may include identifying a probability that a linked page was requested based on the user interaction detected or tracked using the tracking module. The probability may be a result, as described previously, and may be used in determining whether to prefetch a linked page for subsequent user interactions. For example, the method may include retaining a record of specific user interactions and requests for linked pages. The record may be analyzed to determine a probability or likelihood that specific user interactions resulted in the requests for linked pages. The method may include identification of a threshold probability above which user interactions similar to recorded user interactions may be classified as probable for resulting in a request for a linked page. For example, a hold time of the cursor relative to a link to the linked page of greater than 4 seconds and within 200 pixels of the link may have a probability of greater than 50% that the linked page may be requested, and may result in a "probable" classification.

The method may include identifying a probability that previous user interactions resulted in a request for a network resource. The method may include identifying a probability that a current user interaction may result in a request for the network resource. The method may include updating the probability that previous user interactions resulted in a request for the network resource based on whether the current user interaction resulted in a request for the network resource. The method may also include identifying a probability that a future user interaction may result in a request for the network resource, such as by extrapolation of recorded probabilities from past user interactions.

The method may include prefetching a network resource (e.g., web page, video file, audio file) when a request for the network resource is determined to be probable. For example, when the probability is greater than a predetermined threshold value (e.g., 30%, 50%, 75%, 90% and so forth) then the request for the network page, video, audio or other network information may be made.

The method may be implemented using a processor and a memory device as part of the network computing device that are operable to execute the various operations of the method.

Although some of the examples herein describe the retrieval and processing of network resources by a network computing component, such as an intelligent proxy server, application server, data server, or other network device, the technology may also be applied to any number of other hardware or software processes or applications.

Figure 3:
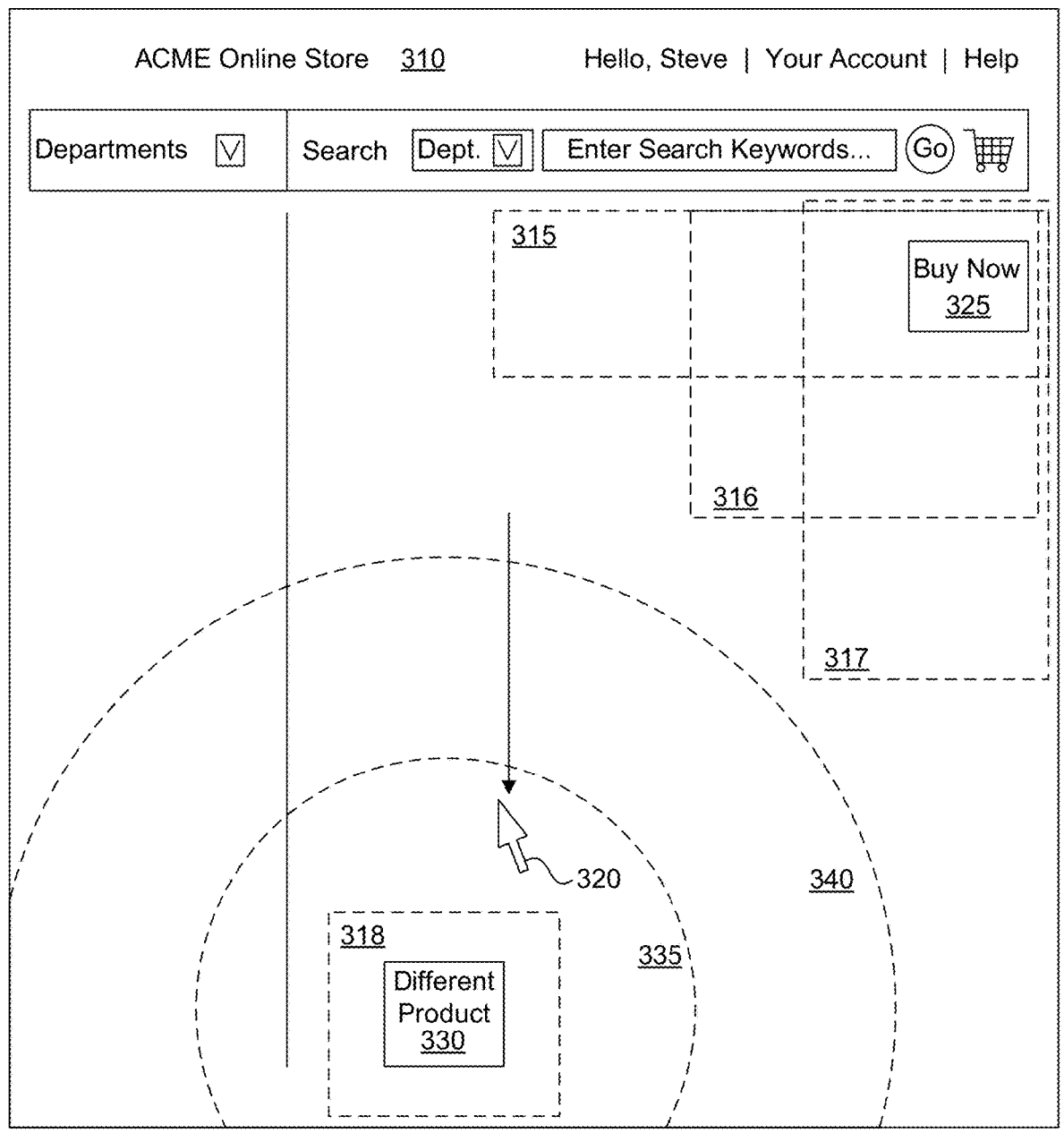
FIG. 3 is an illustration of a prefetch setting implementation with multiple prefetch areas in accordance with an example of the present technology.

Referring to FIG. 3, an illustration of a network resource or page 310. A prefetch system may infer from user interaction such as mouse movement 320 or hold times near the links 325, 330 that one or more of the linked pages included in the links 325 listing may be requested. Content of the linked pages may be caused to load on a client device based on the user interaction. Specifically, elements common to multiple of the linked pages, if any, may be loaded first if there is uncertainty as to which of the multiple linked pages may be requested. In some examples, the linked pages or resources may each be assigned with one or more prefetch criteria and the prefetch criteria for multiple of the linked resources may be the same or may be different.

Tracking of the user interactions, such as cursor movement 320, relative to one or more prefetch areas 318 may provide an indication of prefetches to perform. For example, concentric circles 335 at predetermined distances from a link 330 may be used to identify movement of the cursor 320 toward the link 330, such as when the cursor successively traverses multiple circle boundaries from larger circles 340 to smaller circles 335, toward a center where the link 330 is located. When a cursor is identified as traveling towards a link, a page at the link may be prefetched or begin to be prefetched in anticipation of selection of the link by a user.

Modification or tweaking of the prefetch areas 315 and determination of when to prefetch content based on the user interaction may enable optimization of prefetching to increase confidence and accuracy of prefetches, reducing latency as a result. For example, prefetch area 315 may be modified in size, shape, position, rotation and so forth. Prefetch areas 316 and 317 may represent alternate prefetch areas that may be tested against performance of prefetch area 315 to determine which prefetch area is an optimal predictor of user selection of link 325.

A prefetch area may be comprised of multiple discrete, non-contiguous regions of differing sizes. The size and positioning of effective prefetch regions or areas may be difficult for a human to simply intuit without tracking of movement of a cursor in the first place. However, even tracking of movement and defining of general areas for prefetching may result in prefetch accuracies and latencies which may be improved upon. The present technology may identify successful prefetch areas to assist in avoiding prefetching too much data, which may be costly in terms of time and computing resources, and may also assist in avoiding prefetching so little data that prefetching provides little to no benefit. An optimized prefetch area may be able to maximize prefetch prediction accuracy and prediction time before link selection, as well as reduce latency and false or missing prefetches.

Figure 4:
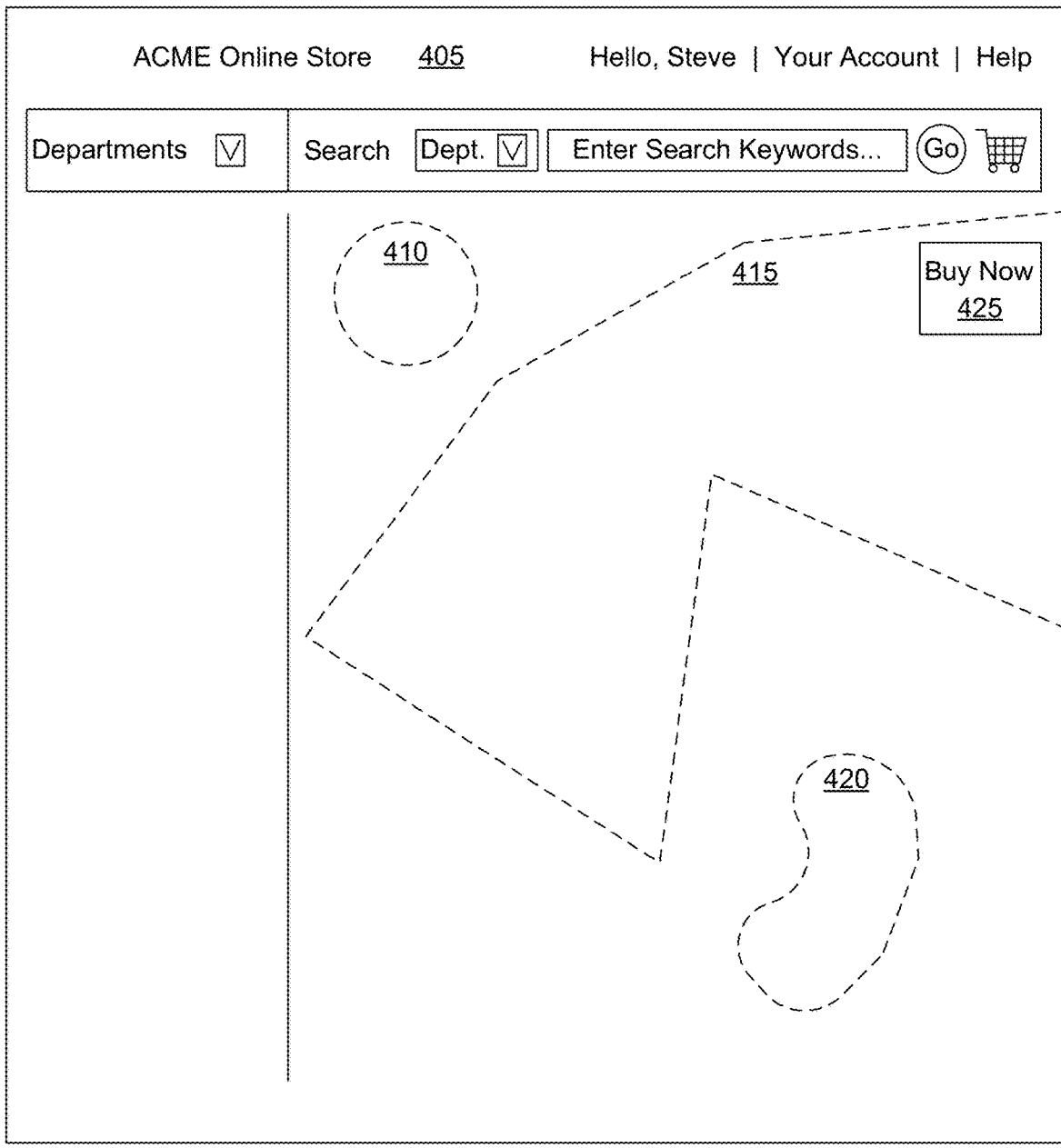
FIG. 4 is an illustration of an implementation with multiple non-symmetric and non-congruent prefetch areas in accordance with an example of the present technology.

With reference to FIG. 4, a product page 405 similar to the page illustrated in FIG. 3 is depicted with a modified prefetch area. The prefetch area includes multiple prefetch regions 410, 415, 420 associated with the "Buy Now" button 425. In practice, the configuration of the prefetch area of FIG. 4 may be an improvement over the prefetch areas of FIG. 3, based on the user interactions for this particular product page. User interactions leading to selection of a link may be irregular. As a result, incorporation of various irregularities in the shapes, positioning and so forth of prefetch regions may be implemented to effectively reach a more optimal prefetch area definition than may be easily identified using manual configuration, even if the manual configuration involves numerous iterations of modification and testing. For example, the prefetch area may comprise any number of the prefetch regions 410, 415, 420, which may be of any size, shape, orientation or position with respect to the page. Optimal prefetch areas may be symmetrical or assymetrical, contiguous or non-continuous, congruent to one another or non-congruent to one another, curved corners or sharp corners, linear sections or curved sections, and may in some instances appear substantially random with no readily identifiable reason as to why a particular configuration is more efficient or effective than another similar yet slightly different modification on the configuration.

Machine learning may be an effective tool for use in optimizing prefetch areas. Machine learning may be useful as a method that takes as input empirical data, such as data from the tracking of user interactions with the page and requests for linked pages, and yields patterns or predictions which may be representative of the underlying mechanism, user thought or interaction process that resulted in the generation of the data. Machine learning systems may take advantage of data to capture characteristics of interest having an unknown underlying probability distribution. Machine learning may be used to identify possible relations between observed variables, such as aspects of user interaction with respect to time and page requests. Machine learning may also be used to recognize complex patterns and make intelligent decisions based on input data. In some examples, machine learning systems may generalize from the available data to produce a useful output, such as when the amount of available data is too large to be used efficiently or practically. As applied to the present technology, machine learning may be used to make modifications to a prefetch area on a basis of user interactions with a page, on a random basis or on any other suitable basis in order to test whether an accuracy of prefetches is improved through the modification.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, bayesian statistics, naive bayes classifier, bayesian network, bayesian knowledge base, case-based reasoning, decision trees, inductive logic programming, gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph are known and are considered to be within the scope of this disclosure and incorporated within this disclosure by reference.

Layout changes to a page setup created by manual configuration of the prefetch areas may result in a shape, position, orientation, etc. of the prefetch area for a linked page which is less than optimal and may involve extensive manual iterative modifications to the prefetch area in an attempt to improve the quality of the prefetch area before modification of the page. In addition to enabling accurate, efficient and rapid optimization of prefetch areas, machine learning may also enable dynamic adaptation to changes in a layout of a page, in order to overcome challenges that presently exist with the time consuming nature of manually configuring the prefetch areas. For example, if a link is moved to the left 50 pixels, this movement may be identified by the technology and the associated prefetch areas may be automatically shifted to the left a corresponding number of pixels. Such movement may affect probability distributions that may overlap before or after the modification, and such factors may be considered and accounted for using the present system, resulting in prefetch areas which are flexible and dynamic in a changing environment without loss of quality.

Referring to FIGS. 5a-5f, example modifications to a prefetch area are illustrated in accordance with the present technology. FIG. 5a may represent an initial configuration of a prefetch area 515 with respect to a link 510 (i.e., in this example the link is a "Buy Now" button). FIG. 5b illustrates an example modification where the prefetch area 517 has been shifted down and toward the right with respect to the initial configuration of FIG. 5a. FIG. 5c illustrates a modification where the prefetch area 519 has been shifted down and toward the right with respect to the initial configuration of FIG. 5a to a lesser extent than that of FIG. 5b, with a further modification causing the sharp edges of the boundary of the prefetch area to be curved or softened. FIG. 5d illustrates an example modification where the prefetch area 521 of FIG. 5a has been rotated counter-clockwise with respect to the link. FIG. 5e illustrates a modification where a size of the prefetch area 523 has been increased. Conversely, the size of the prefetch area may be decreased. FIG. 5f illustrates an example modification where the shape of the prefetch area 525 has been significantly modified such that the shape no longer resembles that of the original configuration. Other example modifications include splitting the prefetch area into multiple discrete prefetch areas or joining multiple discrete prefetch areas into a single, contiguous prefetch area.

Figure 6:
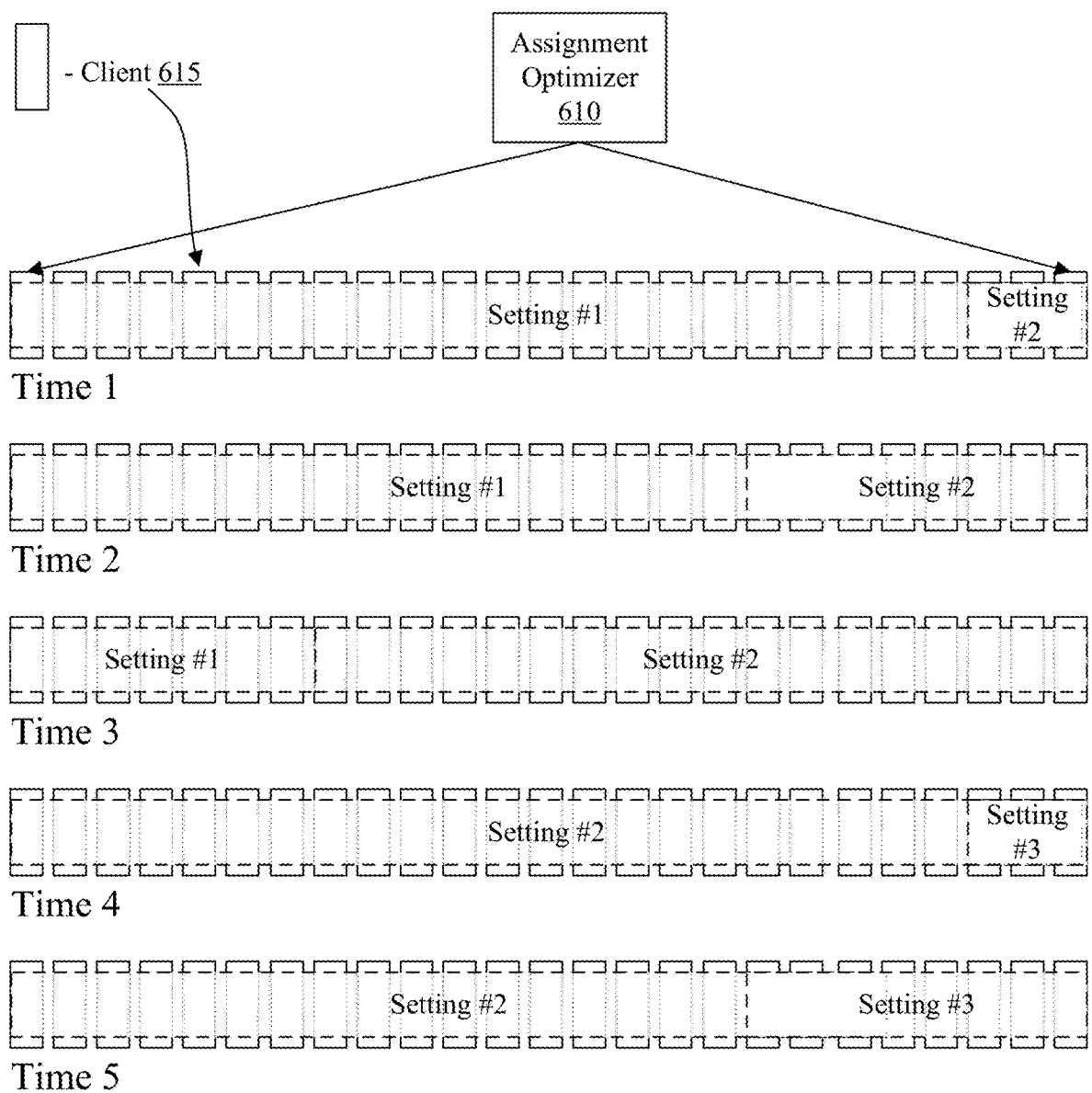
FIG. 6 is an illustration of progressive implementation of prefetch settings in accordance with an example of the present technology.

FIG. 6 illustrates an example testing scenario where an assignment optimizer 610 may be configured to assign clients 615 to different prefetch settings or criteria for testing or actual implementation, and to modify and optimize prefetch areas based on results of the testing. For example, at Time 1, a known useful or "good" setting, Setting #1, may be used for performing prefetches for a majority of clients 615. Setting #2 may be a new setting of unknown performance characteristics and may be applied to a small subset of clients 615 trafficking a page. At Time 2, if the Assignment Optimizer 610 has determined that Setting #2 may be an effective setting and potentially an improvement over Setting #1, the population of clients 615 exposed to Setting #2 may be increased. If again, testing of Setting #2 returns positive results, or results which are more favorable than current performance obtained using Setting #1, the population of clients 615 exposed to Setting #2 may be increased to a majority of clients 615, as at Time 3. Setting #2 may replace Setting #1 as the primary setting against which future setting tests are to be compared, such as at Time 4, where a new setting, Setting #3, is tested against Setting #2. The process may continue where a favorable setting #3 may be more widely implemented, as at Time 5, similar to the process of expanding the reach of implementation of Setting #2 when Setting #1 was the dominant setting.

Prefetch areas may be configured with hard and/or soft boundaries. In a specific example, a prefetch area may have multiple hard or soft boundaries defining different probabilities that a linked page may be requested. For example, referring to FIG. 7, a product page 705 for an electronic retailer is illustrated which includes two prefetch areas. A first prefetch area may include three sub areas 715, 720, 725 and the second prefetch area may include three sub areas 735, 740, 745. Each area may have three boundaries (including two soft boundaries 720 and 725 or 740 and 745 and one hard boundary 715 or 735) with differing probabilities (P) and which overlap 750 to a certain extent.

Immediately surrounding the links in this example are prefetch regions 715, 735 defined by a hard boundary. The hard boundary may be a region inside of which the probability that the linked page may be requested is comparatively high and the linked page may be prefetched upon user interaction within the hard boundary. In a more specific example, the linked page may be prefetched upon user interaction matching user interaction criteria within the hard boundary. For example, a user interaction criteria for prefetching the linked page may be that a cursor reside within the hard boundary for a predefined minimum duration of time.

Outside of the hard boundary are multiple soft boundaries illustrated near lines 720, 725, 740 and 745. The soft boundaries may be referred to as "soft" because user interactions within these boundaries may not necessarily result in prefetching or because an edge of the boundary is not well-defined. For example, the edge of the soft boundary may be a probability gradient transitioning from a higher probability toward a center within the boundary toward a lower probability outside the boundary.

Where a soft boundary is provided around a prefetch area 720, 725, 740 and 745, the soft boundary may represent a page request probability that may or may not exceed a threshold sufficient to trigger prefetching. For example, prefetch area 720 may represent an area in which there is a 60% likelihood that a user will click the "buy now" link 710. If a threshold value for triggering prefetching is 50% or greater, then user interactions in prefetch area 720 will result in a prefetch. If prefetch area 725 represents an area in which there is a 30% likelihood that a user will click the "buy now" link 710 and the threshold value for triggering prefetching is 50% or greater, then user interaction in prefetch area 725 may not result in a prefetch. Multiple probability boundaries may overlap 750 on a page. Where probability boundaries overlap 750, predefined rules may be used to determine an outcome for user interaction at the probability overlap. For example, a rule may state that regions of overlap 750 may not be used for prefetching linked pages due to the uncertainty arising in the probability from the overlap. In another example, a rule may state that where one of the prefetch areas has a lower prefetch probability than the other, then the probabilities are subtracted and the prefetch area with the higher probability results in a prefetch if the difference between the probabilities is greater than a predetermined threshold. As another example, factors such as trajectory, velocity, acceleration, dwell or hold time of the cursor and so forth may be considered for determining a likely target link of interest for prefetching to resolve overlapping probabilities.

Figure 7:
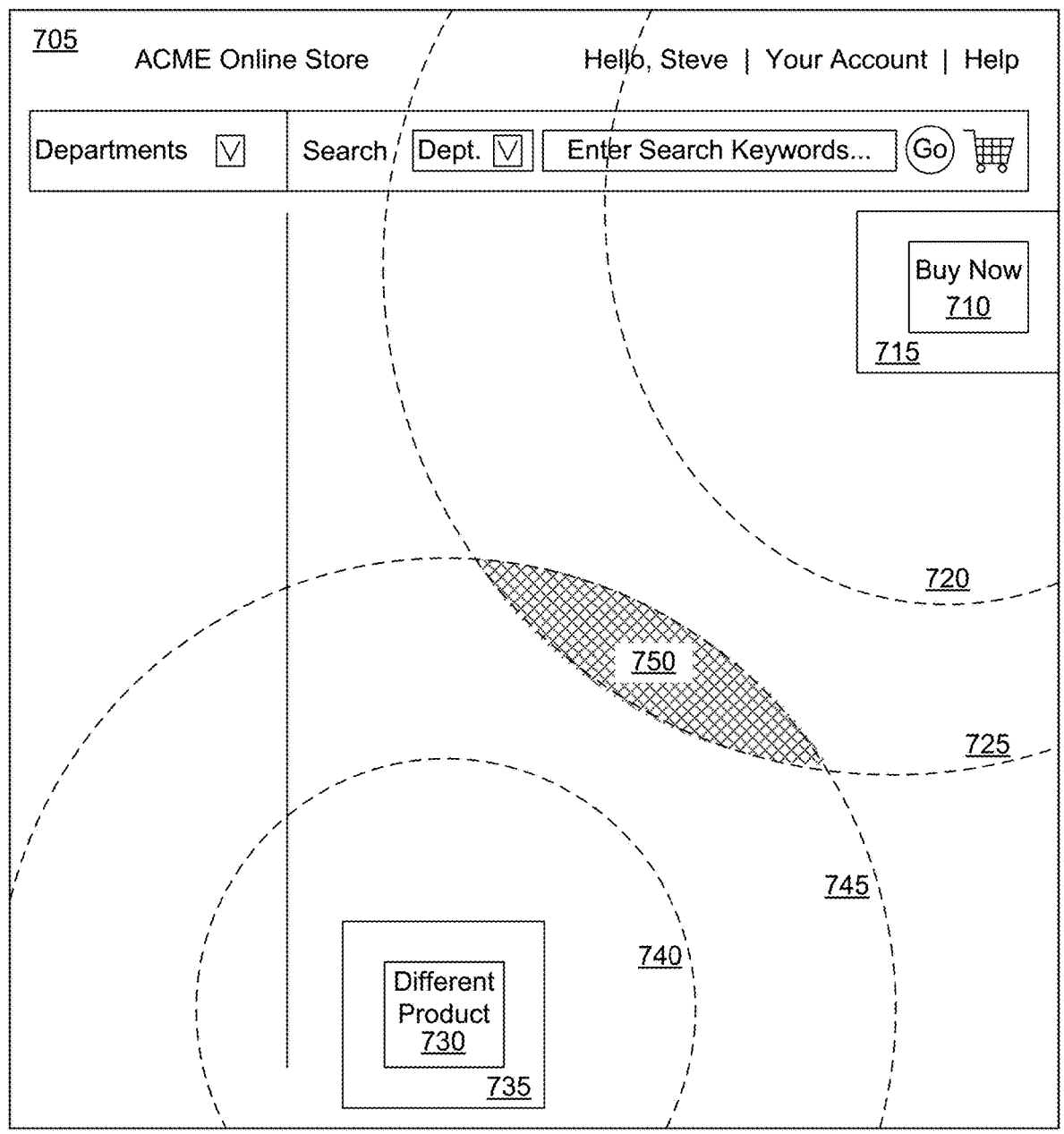
FIG. 7 is an illustration of an implementation with multiple prefetch areas having hard and soft boundaries as well as overlapping boundaries in accordance with an example of the present technology.

Although FIG. 7 illustrates the prefetch areas as individual prefetch regions 715, 720, 725 and 735, 740, 745, each prefetch area may optionally include multiple discrete prefetch regions (see FIGS. 5-6, for example). Each prefetch region may have one or more surrounding probability boundaries associated with the prefetch region as illustrated in FIG. 7. Boundaries for different prefetch regions in a prefetch area or for different probabilities for a same prefetch region may optionally have differing shapes, sizes and other variations one from another. FIG. 7 illustrates a mix of circular and rectangular shaped boundaries for the prefetch areas.

In one aspect, prefetch probabilities may be related to a prefetch rate. For example, a prefetch area for a first link with a high page request probability may result in a prefetch request that may be allowed to use more computing resources (e.g., processor power, memory usage, bandwidth, etc.) than a prefetch request for a second link with a page request probability lower than the page request probability for the first link. Also, a prefetch area with multiple boundaries or subareas representing multiple probabilities may be used to prefetch data associated with the linked page at a rate based on the boundary within which the user interaction occurs. For example, where multiple boundaries define a prefetch area, the center of the area has a highest page request probability and an outside of the area has a lowest page request probability, then user interaction near the center may result in faster and more complete prefetching of the linked page than user interaction near the outer portion of the prefetch area. Also, user interaction towards or away from higher or lower probabilities may result in a dynamically variable prefetch rate which varies based on the user interaction with respect to the varying probabilities.

Figure 8A:
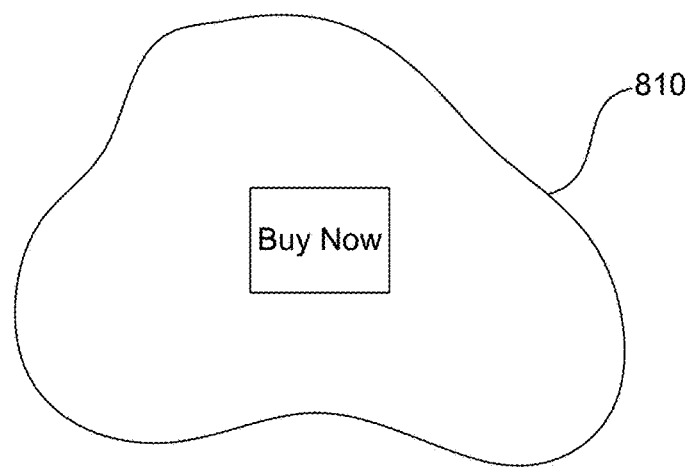
FIGS. 8*a*-8*c* are diagrams illustrating prefetch areas defined by or segmented into a plurality of display units in accordance with an example of the present technology.
Figure 8B:
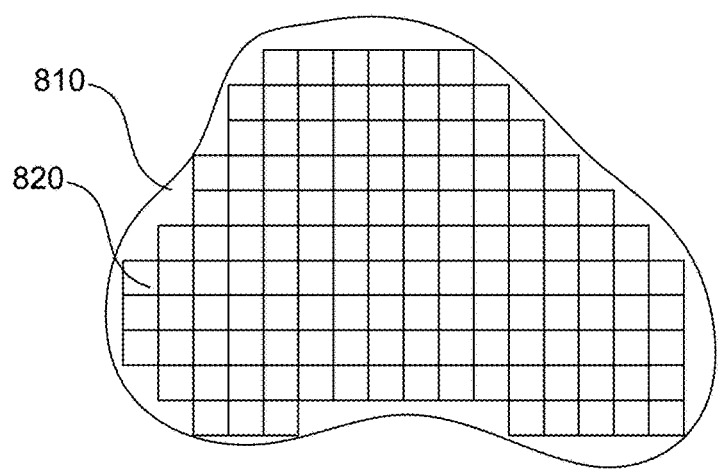
Figure 8C:
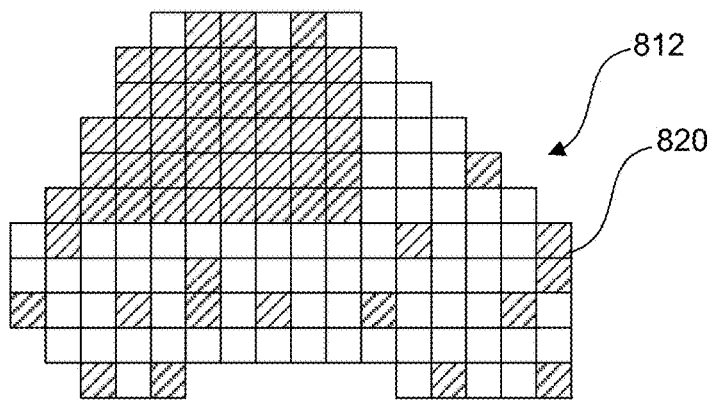

Reference will now be made to FIGS. 8a-8c, which illustrate example prefetch areas 810, 812 divided into display units 820. Consideration of the prefetch areas 810, 812 on a relatively small scale basis may provide a fine granularity or fine resolution for adjustment of prefetch area parameters when making modifications to find an optimal prefetch area configuration. For example, rather than consider prefetch area parameters on the basis of a contiguous area being an individual unit, the prefetch area may be considered as an aggregate or composite of a plurality of smaller display units 820 comprising the prefetch area 810, 812.

A display unit may comprise a pixel, a sub-pixel, a pel, a display area defined by a unit of measurement (e.g., 1 mm$^2$), an arbitrary unit defined by a user or a machine for use in optimizing prefetch areas or the display units may comprise any of a variety of other types of units.

FIG. 8a illustrates a prefetch area 810 with an irregular shape. Due to the irregularity of the shape, display units 820 defining the shape and near an edge of the shape may be split along the boundary of the shape such that a portion of the display unit is within the prefetch area and a portion of the display unit is outside the prefetch area and not included in the prefetch area. Depending on the type of underlying mathematical calculations used or the type of display device on which the display units are displayed, a system may be able to accommodate partial display units within the prefetch area. However, where partial display units are not accommodated for matching the display units with the prefetch area, the incomplete display units around the edges of the prefetch area may be resolved either by removing the incomplete display units from the prefetch area as in FIG. 8b or by adding the remainder of the incomplete display units to the prefetch area. Either of these options may result in a prefetch area shape which conforms to hardware and software configurations while closely approximating the shape of the prefetch area.

FIG. 8c illustrates an example prefetch area 812 where the display units within the borders of the prefetch area are not equally assigned a probability for prefetching linked pages. For example, the display units with the hatched pattern may represent display units selected according to a machine learning process for use in determining whether to prefetch a network resource based on a machine learning optimization process. In this example, the display units with the hatched pattern represent units of interest for prefetching and may be associated with a probability. The display units without the hatched pattern may thus not represent a probability for prefetching.

Figure 9:
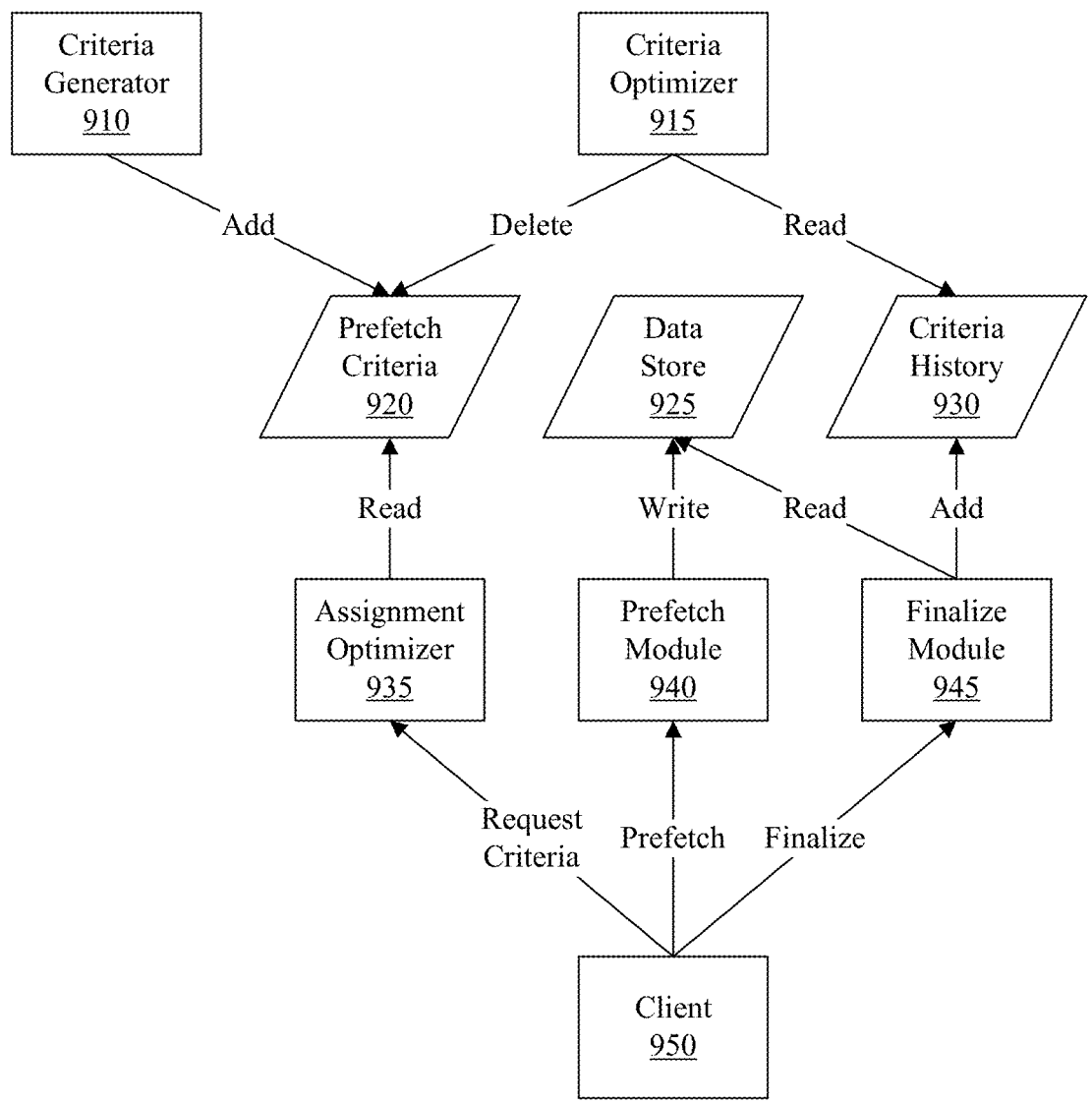
FIG. 9 is a block diagram illustrating a prefetch system in accordance with an example of the present technology.

Referring to FIG. 9, a block diagram of a prefetch area optimization system is illustrated in accordance with an example of the present technology. The system may be implemented across one or more computing device(s) connected via a network. For example, a computing device may include a cache or data store 925 and various modules, such as a criteria generator 910, a criteria optimizer 915, an assignment optimizer 935, a prefetch module 940 and a finalize module 945. The various modules may be executable by a processor of the computing device. The data store 925 may include multiple data stores for storing data such as page data, interaction/tracking data, probability data, latency data, false prefetch data and so forth. The data store 925 may also include other data stores for storing user profile data and so forth.

The term "data store" may refer to any device or combination of devices capable of storing, accessing, organizing and/or retrieving data, which may include any combination and number of data servers, relational databases, object oriented databases, simple web storage systems, cloud storage systems, data storage devices, data warehouses, flat files and data storage configuration in any centralized, distributed or clustered environment. The storage system components of the data store may include storage systems such as a SAN (Storage Area Network), cloud storage network, volatile or non-volatile RAM, optical media or hard-drive type media.

The criteria generator 910 may generate or add new prefetch criteria 920. In one example, the criteria generator 910 may generate one or more prefetch areas comprising one or more prefetch regions of any suitable shape, size or other configuration for a network page. The assignment optimizer 935 may be hosted on a server (i.e., the computing device) and may assign criteria to a client 950 when the client requests criteria for a network page. The client may be configured to detect interaction within a display area of the network page. The display area may comprise a plurality of discrete shapes or display units and may correspond to the prefetch criteria retrieved from the assignment optimizer 935. When the user interaction with the page or the portion of the page in the display area may indicate, based on the prefetch criteria, that the user is likely to request a linked network page, the client may transmit a prefetch request to a prefetch module 940 on the server computing device. The prefetch module 940 may be adapted to prefetch the linked network page and may write to the data store 925 the page prefetches requested by the client device 950. The finalize module 945 may receive a finalize transmission from the client 950 when a user at the client 950 actually selects a link. The finalize transmission may include identification of the selected link and may further include additional data, such as latency, cursor movements, prefetch criteria applied and the like. The finalize module 945 may read from the data store 925 a list of pages prefetched by the prefetch module 940.

The finalize module 945 may add data from the finalize transmission and the data store 925 to a criteria history 930. The criteria history 930 may be accessed and read by the criteria optimizer 915 to determine successfulness or efficiency of the criteria 920 used by the client 950. The criteria optimizer 915 may be used to detect and compare a latency of the linked network page load time for the original prefetch criteria and for the modified or new prefetch criteria, such as by using a client or server clock to time the latency. The latency may be stored in the data store 925 or criteria history 930.

The user interaction detected by the interaction detection module on the client 950 may comprise interactions detected via a variety of different mechanisms, such as but not limited to: touch interface, via mouse or keyboard, voice instructions, gestures and so forth. The criteria history 930 may be used to track a number of false or missing prefetches for the modified prefetch area. The number of false prefetches may be useful in determining an accuracy of the system in terms of how often pages were prefetched that were not ultimately requested. Alternately, the criteria history 930 may be used by the criteria optimizer 915 to track the accuracy of prefetching in terms of the number of prefetches that were not false but were successful.

In one example, the criteria optimizer 915 may analyze test results of modified prefetch areas to determine whether the modification resulted in an improved latency or accuracy of prefetching. The criteria optimizer 915 may instruct the criteria generator 910 to move the prefetch area, change a size, shape or orientation of the prefetch area or perform any of a number of other operations on the prefetch area to modify the prefetch area or prefetch criteria. The modifications may be random, may be based on user interactions with respect to a current prefetch area, may be administrator guided interactions where an administrator provides general input or guidelines within which a machine learning process may make modifications and so forth. The criteria optimizer 915 may discard a modified prefetch area when the latency of load time for the second network page with the modified prefetch area is greater than for the original prefetch area. Alternately, or in addition, when the number of false or missing prefetches for the modified prefetch area exceeds a predetermined threshold number of false prefetches then the modified prefetch area may be discarded.

The data store 925 may be available to store page data, such as HyperText Markup Language (HTML) data, text data, video data, image data, audio data and so forth. The data store 925 may store data for a currently viewed network page as well as pages linked from the currently viewed network page. When prefetches are performed for pages stored at the server computing device, the page data may be retrieved from the data store 925 for delivery to the client device(s) 950.

The criteria history 930 may include an interaction data store for recording user interactions with the prefetch criteria for pages displayed to the users. For example, the interaction data store may include records of cursor movements, touch-based inputs, voice commands, peripheral device inputs and so forth. The interaction data store may be in communication with the finalize module 945 for identifying a type of interaction being detected and for storing the detected interaction.

The criteria optimizer 915 may use data in the criteria history 930 for correlating interaction data with page data to identify probabilities that interactions with the page, or specifically within prefetch areas, resulted in accurate prefetches. False prefetches may be stored as well for reporting false prefetches and identifying potential room for improvement in the association of user interactions with linked pages.

The server computing device may provide network pages for display, such as may be part of an electronic store for example. In the case of a retail store website, the network page may be a home page, a product search page, a product page or the like. The network page may enable input from a user for navigating network pages, searching for products, purchasing products and so forth. The network pages provided for display may include product information via a product catalog data store, etc.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a cloud computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various embodiments, which applications and/or functionality may be represented at least in part by the modules that have been described. Also, various data may be stored in a data store 925 that is accessible to the computing device. The data store 925 may be representative of a plurality of data stores as may be appreciated. The data stored in the data store 925, for example, is associated with the operation of the various applications and/or functional entities described. The components executed on the computing device may include the modules described, as well as various other applications, services, processes, systems, engines or functionality not discussed in detail herein.

The client devices 950 shown in FIG. 9 are representative of a plurality of client devices that may be coupled to the network. The client devices 950 may communicate with the computing device over any appropriate network, including an intranet, the Internet, a cellular network, a local area network (LAN), a wide area network (WAN), a wireless data network or a similar network or combination of networks.

Each client device 950 may be implemented, for example in the form of a client computer, a desktop computer, a laptop computer, a mobile device, a hand held messaging device, a set-top box, heads up display (HUD) glasses, a car navigation system, personal digital assistants, cellular telephones, smart phones, set-top boxes, network-enabled televisions, music players, web pads, tablet computer systems, game consoles, electronic book readers or other devices with like capability, including capabilities of receiving and presenting content from a server. Each client device may include a respective display. The display may comprise, for example, one or more devices such as cathode ray tubes (CRTs), liquid crystal display (LCD) screens, gas plasma based flat panel displays, LCD projectors, or other types of display devices, etc.

Each client device 950 may be configured to execute various applications such as a browser, a respective page or content access application for an online retail store and/or other applications. The browser may be executed in a client device, for example, to access and render network pages (e.g., such as web pages or other network content) served up by the computing device and/or other servers. The content access application is executed to obtain and render features in display content from the server or computing device, or other services and/or local storage media.

In some embodiments, the content access application may correspond to code that is executed in the browser or plug-ins to the browser. In other embodiments, the content access application may correspond to a standalone application, such as a mobile application. The client device 950 may be configured to execute applications beyond those mentioned above, such as, for example, mobile applications, email applications, instant message applications and/or other applications. Users at client devices 950 may access content features through content display devices 1085 or through content access applications executed in the client devices 950.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

With continued reference to FIG. 9, some more specific examples of use of the system will be described. A user of a client device 950 may launch a software browser application (i.e., a browser) and issue requests for network resources, such as web pages, images, videos, applets, documents, and other content pages.

A server or other computing device may receive, from the client device 950, a request for a network page. The server may retrieve the requested web page, and determine which processing actions are to be performed by the browser at the server. The server may then perform any processing actions assigned to the server, and transmit a response to a display of the client computing device. A web page or other network page may include any number of links to other web pages. The server may be configured to retrieve the linked web pages, or portions thereof, prior to receiving any request for a linked web page. As has been described, prefetching may reduce retrieval latencies associated with the linked web pages which are ultimately requested by a client computing device. Each linked web page may be associated with any number of embedded resources, such as image files, videos, JavaScript files, text, databases and the like. In this example, the client device 950 may monitor user interactions with a web page, such as cursor movements reflective of mouse manipulations, and determine a likelihood that a user may activate a link to another web page. If the likelihood exceeds a threshold, the client device 950 may notify the server, and the server may initiate retrieval of the linked web page or some portion thereof before the user activates the link. In other examples, the server may monitor the user interactions with the web page and initiate retrieval before the link is activated.

In one example of retrieval before the link is activated, a JavaScript file associated with a linked web page may itself contain embedded references to other resources, such as images and other JavaScript files. The JavaScript file may include code that loads an image file for display. The server may analyze the linked web page and embedded resources over the course of many requests from other users, and determine that retrieval of the image file referenced in the JavaScript file creates a bottleneck in retrieval, processing, and rendering of the linked web page. That image file may have prioritized loading over other embedded resources associated with the linked web page, even though in a standard retrieval pattern other resources may be retrieved prior to the image file. When the client device 950 notifies the server that there is a likelihood of exceeding a threshold that a link to the linked web page may be activated, such as when a user initiates a cursor movement toward the link, the server may initiate retrieval of the image file prior to any other embedded resource associated with the linked web page, and prior to the user activating the link to request the linked web page.

Prefetching may be initiated from server side, or may be initiated at a client browser or at an intermediary device optimizing what is served by the server for the client device.

The data store 925 or criteria history 930 may be configured to store prioritization data for prioritizing resource retrieval. The prioritization data may indicate which embedded resources associated with a network resource, such as referenced JavaScript libraries, cascading style sheet (CSS)

files, images, videos, animations, and applets, to prioritize during retrieval to minimize latency. Prioritizing retrieval of certain resources may improve the experience of users of client devices 950 when requesting the network resource in the future. The prioritization data may include historical records of retrieval latencies associated with specific resources, data regarding references (i.e., links) to specific resources, data regarding which resources may be within an initially viewable area of a display, data regarding historical processing times associated with the resource, data regarding the file size of the resource, data regarding the geographic location of the content source hosting the resource, and the like.

In operation, a user of a client computing device 950 may use a browser to request a network resource, such as a web page. As described herein, the request may be transmitted to a proxy server of a network computing provider instead of directly to a content source, and a content server associated with the proxy server may retrieve and process the requested web page, and transmit the requested page to the client computing device. Processing the requested page may include analyzing the page to determine whether the page contains links to other web pages. To facilitate faster processing and response times to subsequent requests for linked web pages, the content server may retrieve prioritized resources or entire web pages prior to the user of the client device 950 requesting the linked web page. For example, the content server may retrieve the HTML file for each web page linked from the requested web page, and may store the HTML file in the cache or in some other component. When there is a likelihood that a user may request a linked web page exceeding a threshold, such as when the user initiates a cursor movement toward a link, the client device 950 may notify the content server. The content server may then load the HTML file corresponding to the web page associated with the link into a browser component for processing, and potentially for transmission to the client device 950 if the user activates the link. In another example, the client device 950 may notify the content server when a user initiates a cursor movement that is likely to end on a link, and the content server may initiate retrieval of one or more prioritized resources associated with the linked web page. The prioritized resources may be: the largest resources, the resources that historically take the longest amount of time to retrieve, resources that create a bottleneck during web page rendering if they have not yet been retrieved, etc.

The user of the client device 950 may interact with the initially requested page, for example by moving a mouse cursor on a display of the page or by looking at different portions of the displayed page. The client device 950 may be configured to track such interactions and determine which link, if any, a user may click next, and then notify the computing device of which link may be clicked next. When the user initiates a cursor movement with a mouse, the client device 950 may use historical interaction data associated with the user and information about the instant movement, such as direction, acceleration, movement arc, and the like in order to make the determination. If the client device 950 is equipped with a user-facing camera, then the client device 950 may track a user's eye movements and determine which link the user may click based on which link the user is looking at, how long the user looks at the link, etc. In some embodiments, the camera or some other sensor may track hand movements when the client device is configured with a touch screen, and therefore no mouse movements may be input. In some embodiments, information about the user's historical mouse, eye, or hand movements, or a profile of how the user interacts with network resources, may be stored at the an intermediate server or some other component of the network provider so that user-specific usage characteristics may be available at any client device 950 the user may use. In other words, user interactions likely to result in a page request may be determined on an individual user basis rather than for an aggregate user basis. Storage of the information at the network computing provider may be beneficial because such characteristics may be specific to the user, for example the way that the user moves the mouse in a curved path toward a link.

Figure 10:
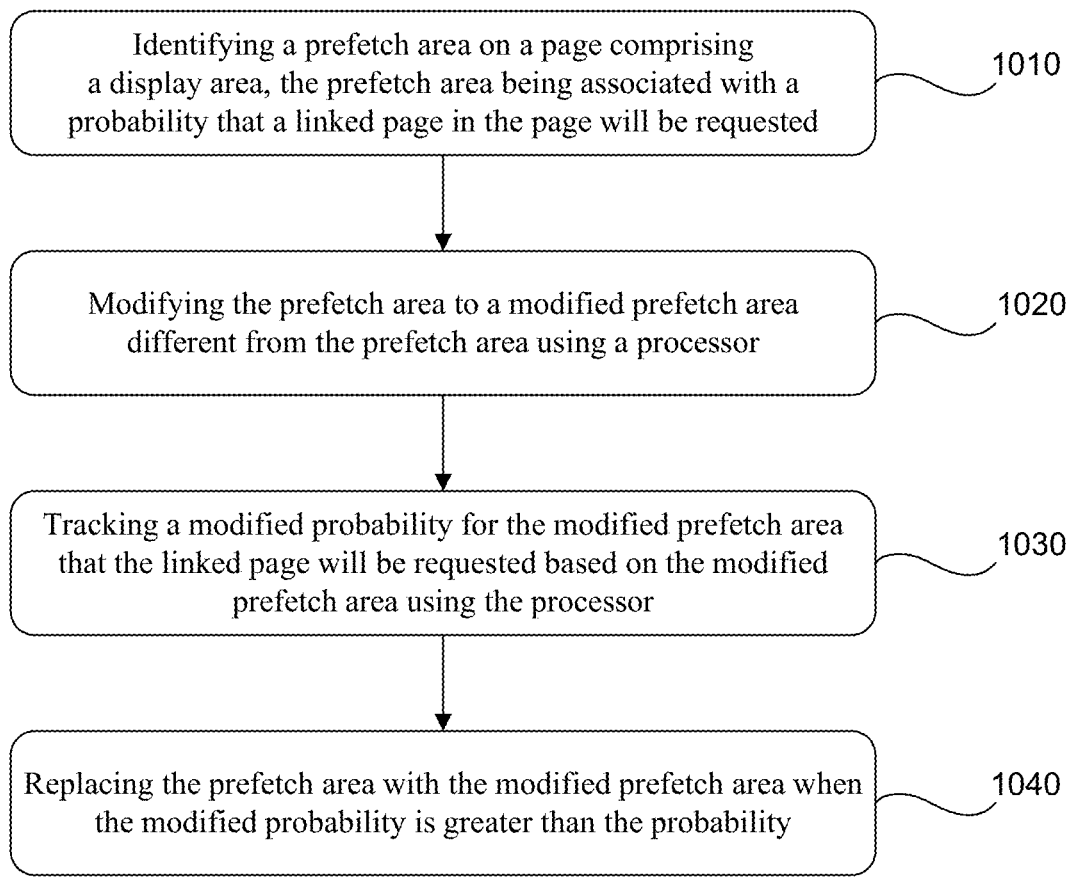
FIG. 10 is a flow diagram illustrating a prefetch optimization method including replacement of an existing prefetch area when a probability of accurate prefetch prediction for a modified prefetch area is an improvement over the existing prefetch area in accordance with an example of the present technology.

Referring to FIG. 10, an example method for optimizing page prefetch areas is illustrated as a flow diagram. The method may include identifying 1010 or defining a prefetch area on a page. The prefetch area may be associated with a probability that a linked page in the page may be requested. The probability may be based on factors such as user interaction with the page relative to the prefetch area. The prefetch area may be modified 1020 in any of a number of different ways to form a modified prefetch area different from the prefetch area. Requests for the linked page may be tracked 1030 with consideration of user interaction relative to the modified prefetch area to obtain a modified probability that the linked page may be requested. The prefetch area may be replaced 1040 with the modified prefetch area when the modified probability is greater than the probability. In other words, if the user interaction with respect to the modified prefetch area indicates a greater likelihood that the linked page may be requested, then the modified prefetch area may be used in place of the pre-modified prefetch area.

In one example, the method may include calculating a user group sample size for testing the modified prefetch area based on at least one of a type and a degree of modification to the prefetch area. The type of modification may refer to translation, rotation, resizing, restructuring (i.e., changing the shape), and so forth. The degree of modification may refer to the degree to which the prefetch area is translated, rotated, resized, etc.

Calculation of the user group sample size may be performed using machine learning. Rather than using human trial and error in determining an appropriate sample size for testing modified prefetch areas, machine learning may be used to identify how many users to include in the same test and for how long to include the users in the sample. The sample size may be a population subset of a larger total population. For example, the sample size may include 10% of the users or visitors to a network page or service. The method may further include expanding testing of the modified prefetch area to a second population subset, which again may be smaller than a larger total population, but which may be larger than the first population subset. Expansion of testing to a larger subset of the population may typically be performed when modifications to the prefetch area have been made, and the modifications appear to result in more accurate prefetches and lower latencies when applied to the first subset of users. In other words, a second subset of users may become involved in the optimization process when the modified probability for the modified prefetch area used for the first subset of users is greater than the probability of the unmodified prefetch area.

In one aspect, the prefetch area may include a plurality of prefetch areas or regions, each with a respective probability associated with different linked pages. The method may also include dividing a prefetch area into multiple discrete regions or combining multiple discrete regions into an individual prefetch area.

Figure 11:
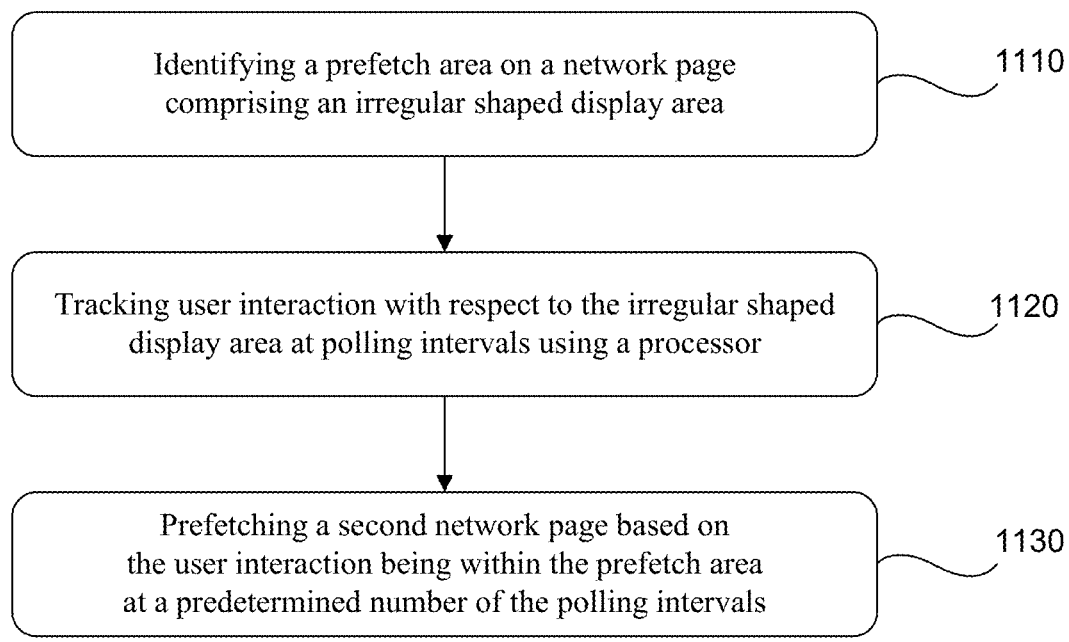
FIG. 11 is a flow diagram illustrating a prefetch optimization method utilizing an irregularly shaped prefetch area in accordance with examples of the present technology.

Referring to FIG. 11, a method for optimizing page prefetch areas is illustrated in a flow diagram in accordance with an example of the present technology. The method may include identifying 1110 a prefetch area on a network page. The prefetch area may have an irregular shaped display area. Irregular shapes may be shapes without lines of symmetry and/or may include sides that are not the same as other sides of the shape. The method may further include tracking 1120 user interaction with respect to the irregular shaped display area at polling intervals using a processor. The polling intervals may be determined using a client- or server-side clock, for example. The polling intervals may be a predetermined period of time or a predetermined number of CPU (central processing unit) time cycles, for example. When user interaction is detected within the prefetch area at a predetermined number of the polling intervals, then the second network page may be prefetched 1130.

In one example, rather than tracking user interaction with respect to the irregular shaped display area, user interaction may be tracked with respect to prefetch criteria or parameters with or without respect to the polling intervals. The second network resource may be prefetched based on the user interaction matching the prefetch criteria.

The method may further include tracking an accuracy of prefetching for the second network page. The accuracy may be based on whether the second network page is requested from the network page. For example, a failed request for prefetching when the second page results is not being requested may reduce the overall prefetching accuracy.

When the prefetch area is modified to a modified prefetch area for the second network page, the accuracy of prefetching the second network page may be tracked using the modified prefetch area based on whether the second network page is requested from the network page when a cursor is within the modified prefetch area; and replacing the prefetch area with the modified prefetch area when the accuracy is increased. Modification of the prefetch area may involve modification of any of a number of different features of the prefetch area, such as moving the prefetch area with respect to the network page, modifying the prefetch area by changing a size or a shape of the prefetch area or changing the size or the shape of the prefetch area by changing the size or the shape of the prefetch area to an irregular shape. In one example, the modified prefetch area may be a computer generated variation of the current prefetch area.

Figure 12:
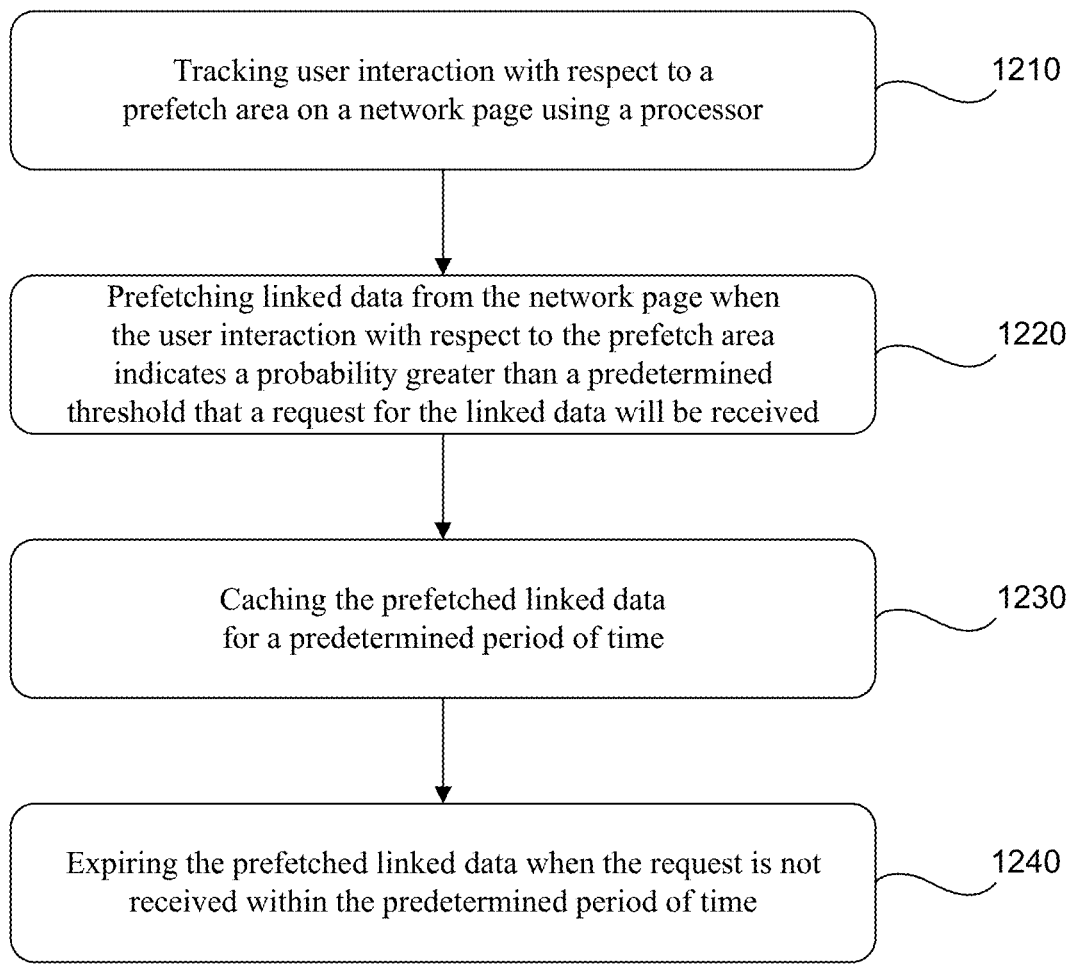
FIG. 12 is a flow diagram illustrating a method involving caching of prefetched linked data for a period of time in accordance with an example of the present technology.

Referring to FIG. 12, a method of prefetching data is illustrated in a flow diagram in accordance with an example of the present technology. The method may include tracking 1210 user interaction with respect to a prefetch area on a network page and prefetching 1220 linked data from the network page when the user interaction with respect to the prefetch area indicates a probability greater than a predetermined threshold that a request for the linked data may be received. The prefetched linked data may be cached 1230 for a predetermined period of time. For example, prefetched linked data may relate to a product that a user is likely to purchase and caching of the prefetched data may result in holding the inventory of the product for the user at least for the predetermined period of time before releasing the product to allow another user to consume the inventory. In other words, the prefetched linked data may be expired 1240 when the request is not received within the predetermined period of time. The predetermined period of time may vary depending on a particular application. For a high volume electronic retail store, availability of products which are ultimately not going to be purchased may be desirable. As a result, relatively short time periods, such as one minute or less, 30 seconds or less, 20 seconds or less, 10 seconds or less or 5 seconds or less may be used to ensure that prefetched orders do not preclude other users from purchasing the product for a substantial period of time.

Expiration of the data may take a variety of different forms. For example, expiration of the data may be performed by expiring a token or key associated with the data and which may be used when valid to access the data. As another example, expiring the prefetched linked data may include deleting the prefetched linked data, such as data downloaded to the client device or data created when prefetching order creation pages. As another example, expiring the prefetched linked data may involve invalidating the prefetched linked data, such as by rendering a key or token invalid or otherwise unusable.

As may be appreciated from these examples, prefetching of data based on user interaction may result in prefetching of data at the client device or even prefetching of data at server-side devices. For example loading of content, such as video and image data may be performed at the client device while loading of order data and/or processing of data or requests submitted from the client device may result in processing and/or prefetching at the server-side device(s).

In addition to prefetching data to the client device, the client device (or rather an application such as a browser on the client device) may be used in tracking the user interactions that result in prefetching at one device or another. Interactions with local user interface components at the client device, such as may be part of the browser, may be treated as local user interactions or remote user interactions depending on the processing involved with the interaction and the remote session browsing configuration. For example, the selection of a preferences option in a browser menu may be handled entirely as a local user interaction by a browser. The processing involved for user interactions to select a link, provide visual feedback regarding the selection, display popup windows, and process operations resulting from a selection may be at least partially performed locally. As discussed above, processing user interactions locally may provide greater responsiveness at the browser as opposed to sending user interaction data to a remote server for processing. As another example, when using a remote session browsing configuration that specifies extensive processing on the server (e.g., a remote session browsing configuration using a remote session communication protocol such as RDP (remote desktop protocol)), the selection of content in a browser may be handled both as a local user interaction and a remote user interaction. The limited processing used to provide interface feedback corresponding to the selection may be handled at the client device in order to provide the appearance of interface responsiveness, while some operations or commands may involve processing of the requests for network content to be displayed in the content display area of the browser as user interaction data at the server. The server may then transmit updated processing results corresponding to the refreshed network content back to the client device for display.

Based on user interactions with the browser or page content displayed within the browser, the browser or some other component of the client computing device may be configured to determine or predict the destination of the cursor, and then notify the server that the user may activate a link at the destination location. For example, the browser may be configured to measure or receive measurements of the speed, acceleration, position coordinates, and/or the movement path of the cursor. The browser may use the measurements in order to determine a likelihood that the cursor may end up on a link, and furthermore whether the user may activate the link. Making the determination at the client computing device, by the browser or some other client side component, may provide a performance benefit when compared to making the determination at a separate device, such as at the server. The effects of network latency may be reduced or eliminated when measurements are taken and the determination or prediction is made at the same device.

In one example, the browser may identify a likely path for a cursor which ends on a specific link. In response to determining that the likelihood of the user activating the specific link exceeds a threshold, the browser may notify the server. The browser may consider the user's history of cursor along with the measurements described above when determining the likelihood that the user may click a link and which link among multiple links is likely the link to be clicked. For example, the user may have a history of moving the cursor in a curved path toward a link prior to clicking on the link. Accordingly, the browser may determine that the user is likely to continue to move the cursor in a curved path. Taking speed, acceleration, deceleration, etc. into consideration, the browser may determine that the cursor may likely end up on the specific link, or that there is a likelihood exceeding a threshold that the cursor may end up on the specific link. Tracking historical interactions may result in more accurate determinations. For example, by factoring an original cursor position and a subsequent cursor position, the browser may determine that cursor may travel a generally straight line and end on the particular link.

The browser may store historical interaction data or user interaction profile information on the client device. Storing the historical interaction data or user interaction profile information on the client device may help ensure that a determination of the likelihood that a user may activate a link is based on the specific input device and display type that is currently being used. In some cases, the specific hardware of the client device may alter the way the user interacts with the network resource and chooses links to activate. For example, if one client computing device, such as a desktop computer, is configured with a mouse, and a second client computing device, such as a laptop computer, is configured with a touch pad, the path that the cursor typically travels may be different even though the same user is operating both devices. In such cases, data about how the user manipulates a specific input device may have reduced utility on client computing devices with a different input device. However, if each client device is equipped with a user-facing camera, the way that the user looks at the display and at links prior to activating the links may be consistent across client computing devices and input methods. In some embodiments, historical interaction with data may be stored at the network computing provider, for example in a storage component of the server. By storing the historical interaction data at the network computing provider or server, browsers on other client devices used by the same user on different devices may access the data for use in determining likely link activations for the user.

In some embodiments, the browser may not use historical interaction data to determine where a user may move a cursor. Instead, the browser may use a standard path, such as a straight path, a curved path, some other path, or an average of several predetermined paths in order to determine where a user may move a cursor. In such cases, the browser may not determine a specific link that is likely to be activated, but rather a region of the display that the cursor may arrive at. For example, the browser may determine that, regardless of whether the user follows a straight path or a curved path, the cursor is likely to arrive at the link list. The browser may determine which of the links in the list the user is most likely to select, or the browser may transmit a more general notification about the link list to the server, and the server may then determine which of the links in the list the user is most likely to select. For example, the browser or the server may determine which link is the most popular, which link the user has selected during a previous browsing session, etc.

Figure 13:
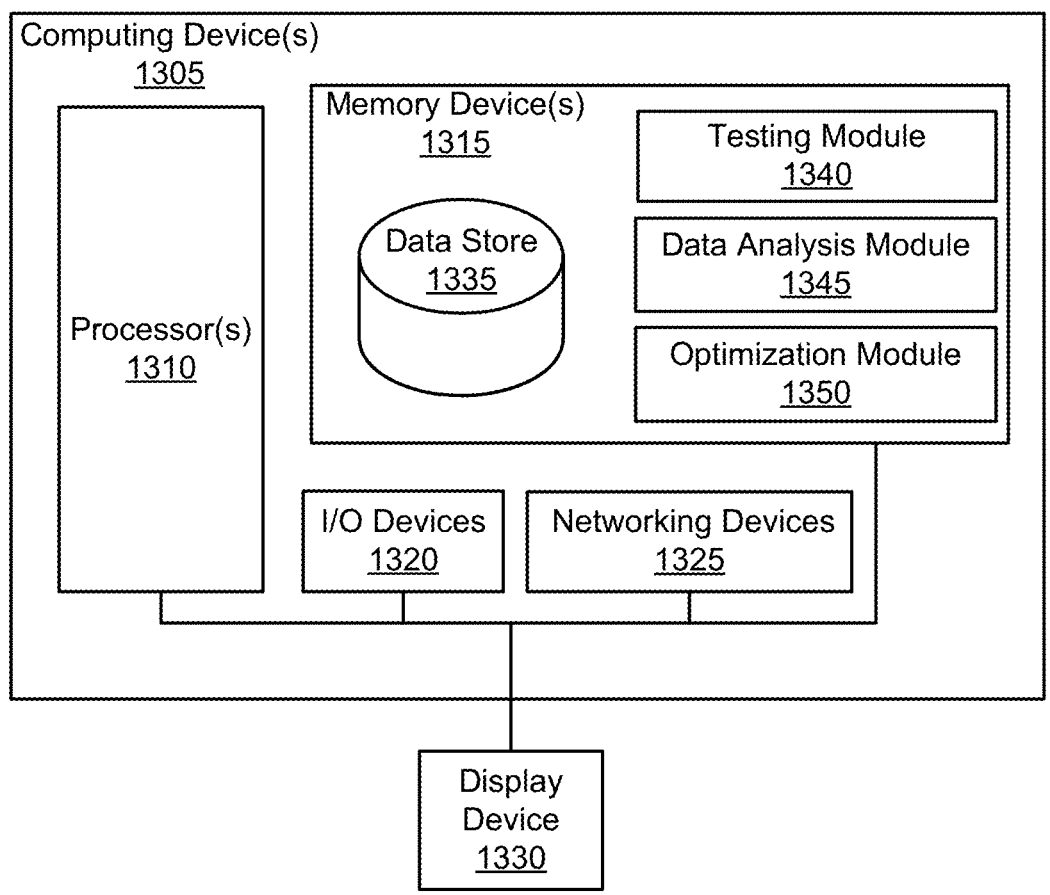
FIG. 13 is a block diagram illustrating a prefetch optimization system in accordance with an example of the present technology.

Referring to FIG. 13, an example prefetch system is illustrated which may be implemented as a server side system, for example, in communication with a browser for monitoring user interactions and using the success of user interactions resulting in accurate prefetch predictions in optimizing prefetch areas within a browser window.

FIG. 13 illustrates a computing device 1305 on which modules 1340, 1345, 1350 of this technology may execute. A computing device 1305 is illustrated on which a high level example of the technology may be executed. The computing device 1305 may include one or more processors 1310 that are in communication with memory devices 1315. The computing device may include a local communication interface for the components in the computing device 1305. For example, the local communication interface may be a local data bus and/or any related address or control busses as may be desired.

The memory device 1315 may contain modules that are executable by the processor(s) and data for the modules. Located in the memory device 1315 are modules executable by the processor 1310. For example, a testing module 1340, a data analysis module 1345 and an optimization module 1350, as well as other modules, may be located in the memory device 1315. A data store 1335 may also be located in the memory device 1315 for storing data related to the modules and other applications along with an operating system that is executable by the processor(s) 1310.

The computing system 1310 of FIG. 13 may be utilized for testing and optimizing prefetch areas. For example, the testing module 1340 may implement an untested prefetch area by introducing the untested prefetch area to a test environment exposed to a subset of users. The test environment allows testing of the untested prefetch area to determine how well the untested prefetch area performs in efficiency and reduction of latency as compared with one or more tested prefetch areas. The data analysis module 1345 may analyze the test data obtained by testing the untested prefetch area using the processor 1312 to determine whether the prefetch area meets predetermined specifications for efficiency, latency and so forth and further to determine whether the prefetch area meets or exceeds specifications established by a previously tested prefetch area. The optimization module 1350 may replace a previously tested prefetch area with a currently tested prefetch area as a standard for use when the performance of the currently tested prefetch area exceeds that of the previously tested prefetch area in one or more metrics. Whether the performance of the currently tested prefetch area exceeds that of the previously tested prefetch area in one or more metrics or not, the optimization module may make modifications to one or more previously tested prefetch areas, the currently tested prefetch area or create a new prefetch area for testing in an attempt to discover a more optimal configuration through additional testing.

The computing device 1305 may further include or be in communication with a display device 1330. Whether implementing new prefetch areas, testing prefetch areas or evaluating performance of prefetch areas against one another, the display device 1330 may be useful in display reports, metrics, configurations and so forth that may be useful in evaluating the performance of specific prefetch areas or in evaluating the performance of the machine learner in creating and improving on prefetch areas.

Various applications may be stored in the memory device 1315 and may be executable by the processor(s) 1305. Components or modules discussed in this description that may be implemented in the form of software using high programming level languages that are compiled, interpreted or executed using a hybrid of the methods.

The computing device 1305 may also have access to I/O (input/output) devices 1320 that are usable by the computing devices 1305. An example of an I/O device 1320 is a display screen 1330 that is available to display output from the computing devices 1305. Other known I/O device 1320 may be used with the computing device 1305 as desired. Networking devices 1325 and similar communication devices may be included in the computing device. The networking devices may be wired or wireless networking devices that connect to the internet, a LAN, WAN, or other computing network.

The components or modules that are shown as being stored in the memory device may be executed by the processor. The term "executable" may mean a program file that is in a form that may be executed by a processor. For example, a program in a higher level language may be compiled into machine code in a format that may be loaded into a random access portion of the memory device and executed by the processor, or source code may be loaded by another executable program and interpreted to generate instructions in a random access portion of the memory to be executed by a processor. The executable program may be stored in any portion or component of the memory device. For example, the memory device may be random access memory (RAM), read only memory (ROM), flash memory, a solid state drive, memory card, a hard drive, optical disk, floppy disk, magnetic tape, or any other memory components.

The processor may represent multiple processors and the memory may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

EXAMPLES

With an example latency goal of returning a requested page within 1.5 seconds of initiation of the request, various factors may be considered. For example, to achieve such a goal, the request and processing may be broken down into parts, each consuming a portion of the 1.5 seconds. After a customer clicks a link to make a request, the request may include a request for overhead, which may consume approximately 500 ms. An ordering API for processing the request may consume an additional 500 ms and network communications may consume the remaining 500 ms before the requested page is rendered on a client device.

In many scenarios, however, while the request for overhead and network communications may respectively consume 500 ms, the ordering API may consume more on the order of 2000 ms of time. Assuming no changes are made to the ordering API, prefetching of data may be used to achieve the 1.5 seconds latency goal. For example, if the page request may be accurately predicted at least 1.5 seconds (i.e., 1500 ms) in advance, that 1.5 seconds may be used to precompute or prefetch the requested data or page such that the remaining time expenditures include 500 ms for the overhead request, 500 ms for network communications and 500 ms for finalizing the precomputed order before the page is rendered. To an end user, the latency for the operation is 1.5 seconds, even though an additional 1.5 seconds of time was expended in precomputing the operation.

An experiment may demonstrate feasibility of predicting network resource requests at least 1.5 seconds ahead of time with a satisfactory degree of accuracy and without significantly increasing a total cost of ownership (TCO) for executing the prediction and prefetching.

Figure 14:
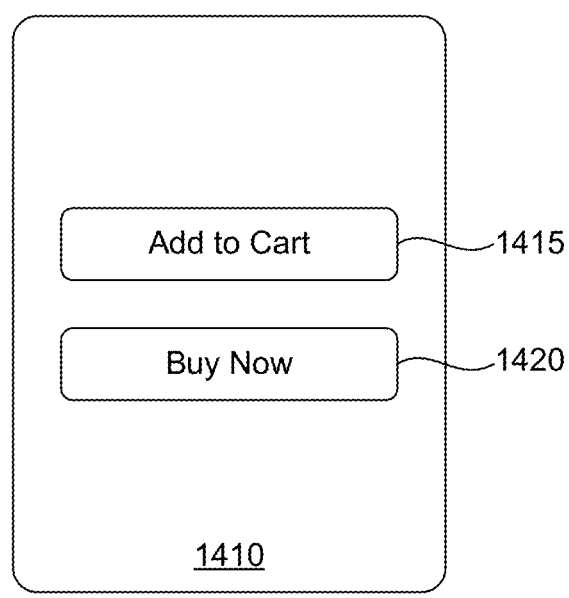
FIG. 14 is a block diagram illustrating a purchase interface for use in explaining of FIGS. 15-21.

FIG. 14 is a simplified purchase interface 1410 including multiple purchase options 1415, 1420 for purposes of illustrating features of a similar purchase interface which will now be described but which is at least partially obscured to demonstrate predictability of prefetching at various periods of time in advance of the request for network resources, which predictability may in turn be used for defining at least a starting point for an optimized prefetch area.

Figure 15:
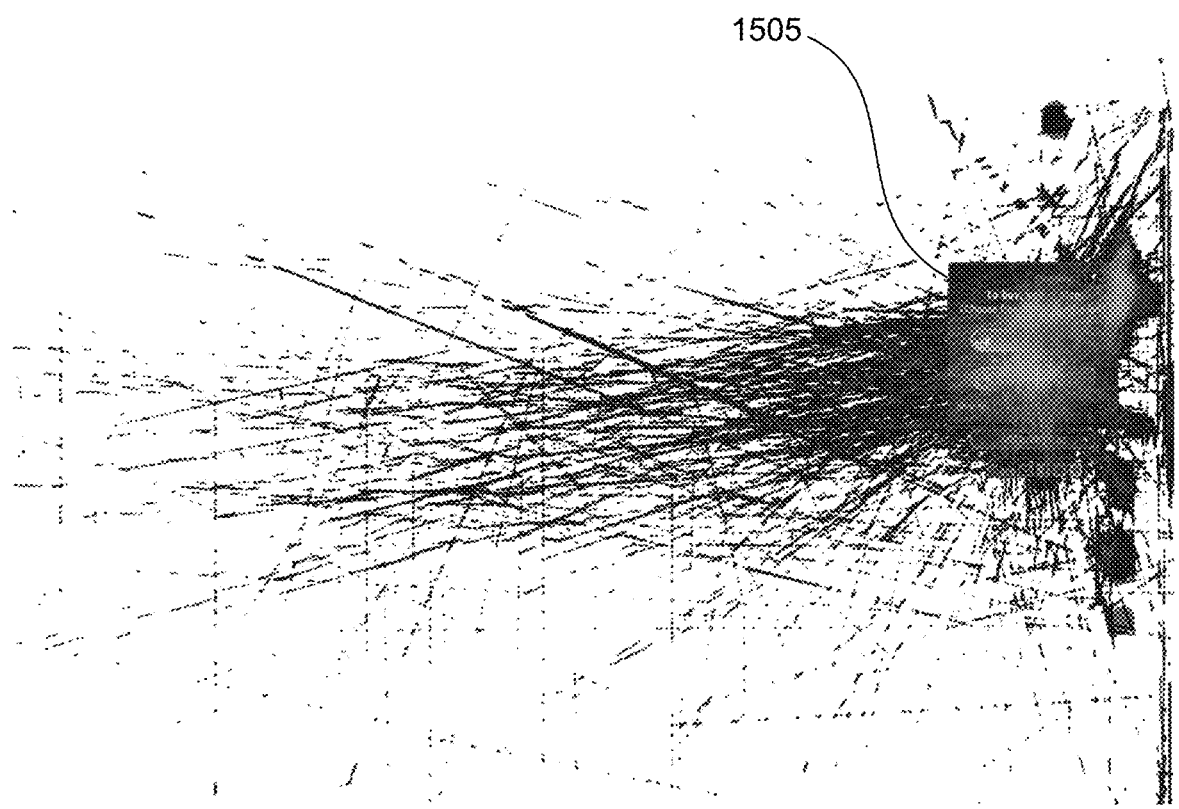
FIG. 15 illustrates mouse movements relative to a purchase interface four seconds before selecting the purchase interface in accordance with an example of the present technology.
Figure 16:
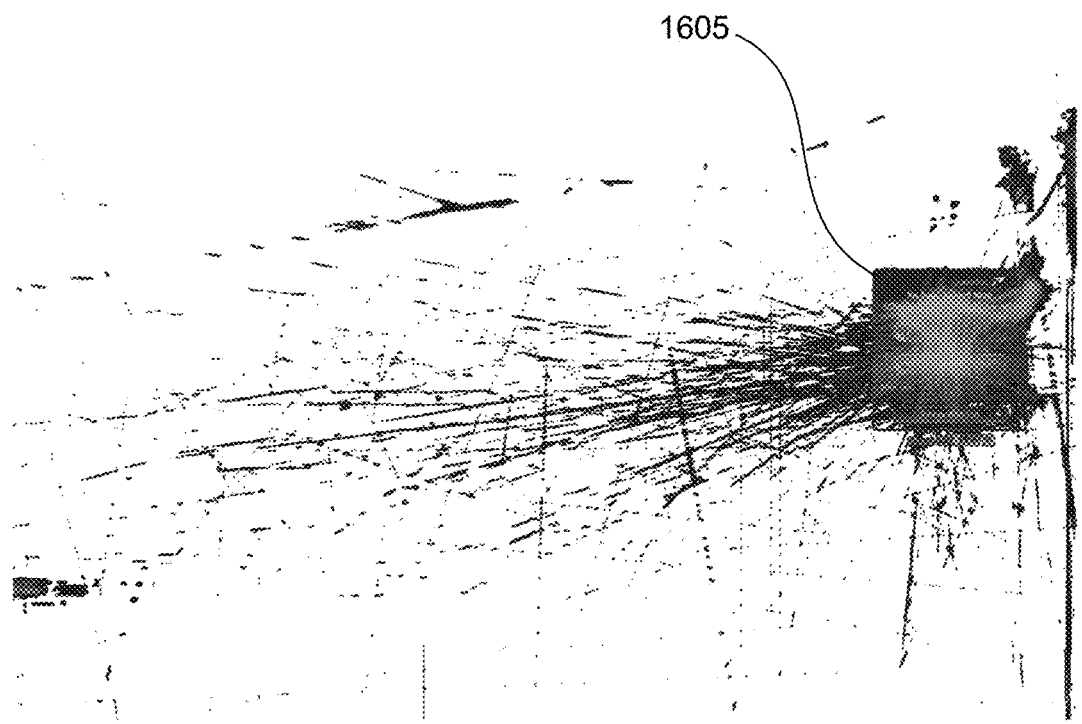
FIG. 16 illustrates mouse movements relative to a purchase interface three seconds before selecting the purchase interface in accordance with an example of the present technology.
Figure 17:
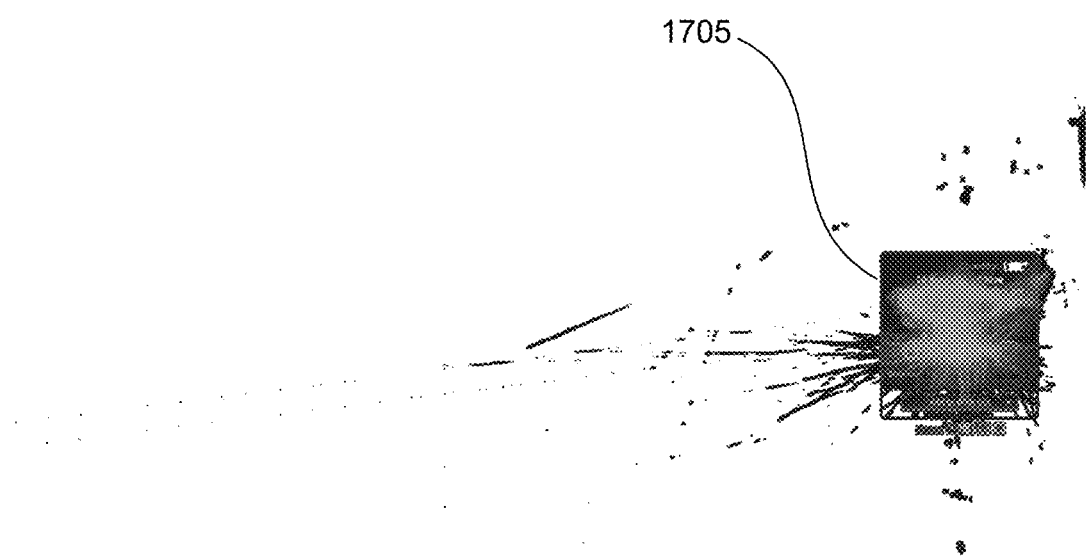
FIG. 17 illustrates mouse movements relative to a purchase interface two seconds before selecting the purchase interface in accordance with an example of the present technology.
Figure 18:
FIG. 18 illustrates mouse movements relative to a purchase interface one second before selecting the purchase interface in accordance with an example of the present technology.

FIG. 15 illustrates tracked mouse movements relative to a purchase interface 1505 approximately four seconds before a purchase option may be selected from the purchase interface. FIG. 16 illustrates similar tracked movements relative to the purchase interface 1605 prior to selection of the purchase, but at three seconds prior to the selection. FIG. 17 illustrates the tracked movements with respect to the purchase interface 1705 at two seconds prior to the selection and FIG. 18 illustrates the tracked movements relative to the purchase interface 1805 at one second prior to the selection of the purchase link. As may be appreciated from viewing FIGS. 15-18, movement of the mouse increasingly focused on an area over the purchase options in the purchase interface approaching the actual selection of a link.

Figure 19:
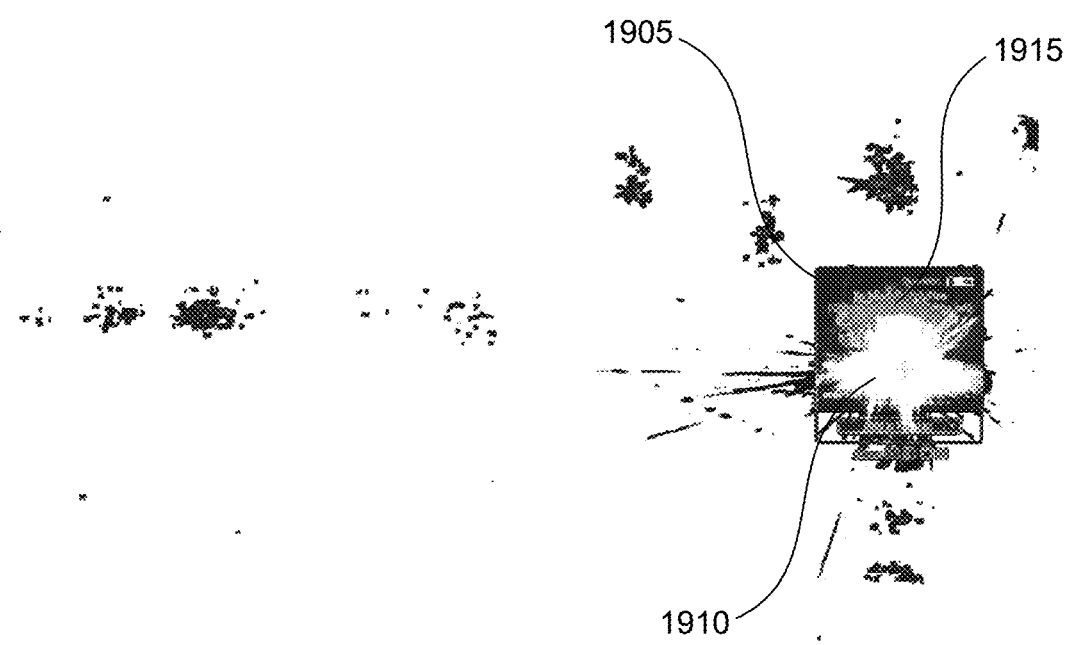
FIG. 19 illustrates mouse movements relative to a purchase interface one second before selecting the purchase interface for segmented traffic in accordance with an example of the present technology.

In one aspect, tracking may be provided for segmented traffic for more accurate interpretations of the mouse movements relative to the links. For example, the purchase interface illustrated in FIG. 14 includes an option for "Add to Cart" and an option for "Buy Now". FIG. 19 illustrates the segmented traffic for the two purchase options overlaid on the purchase interface. The "Add to Cart" mouse movements are shown in gray 1915 over the black colored purchase interface 1905 and the "Buy Now" mouse movements are shown in white 1910 over the gray "Add to Cart" mouse movements and the black colored purchase interface. Separate consideration of segmented traffic may enable more accurate predictions for prefetching network resources.

Figure 20:
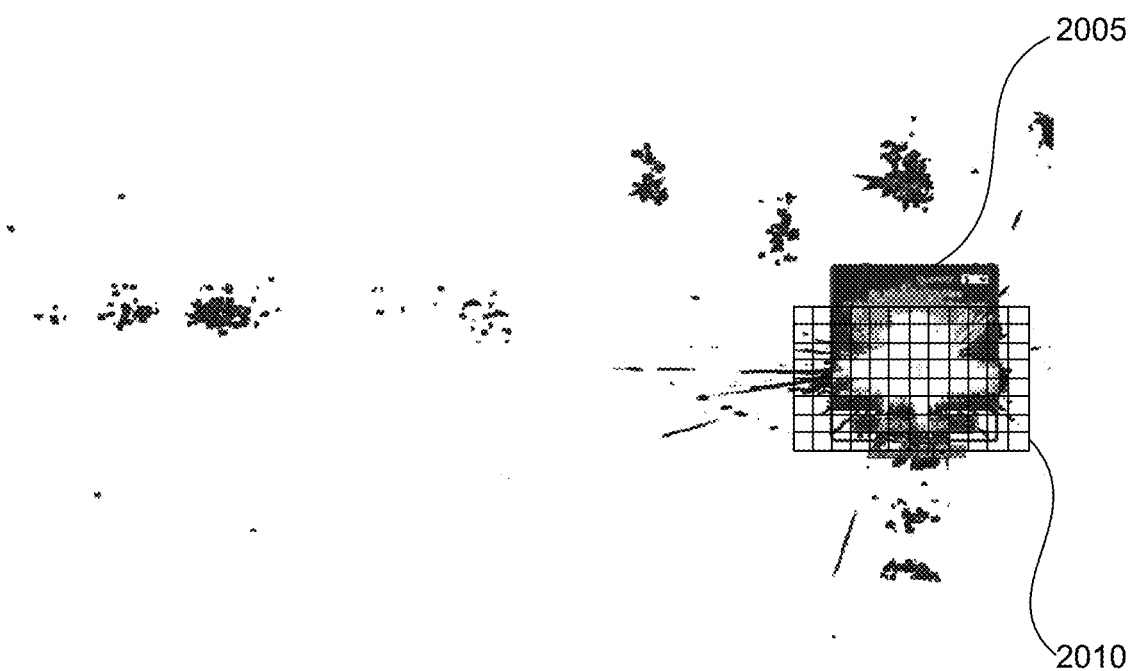
FIG. 20 illustrates a grid-like prefetch area positioned over tracked mouse movements for predicting interactions with the purchase interface in accordance with an example of the present technology.

Referring to FIG. 20, a grid pattern 2010 may be overlaid on the mouse movements over the purchase interface 2005. The grid pattern 2010 may represent a prefetch area similar to those described previously. In one aspect, the grid cells may be very closely spaced together to provide a fine granularity. For example, given a square grid prefetch area of 150 pixels by 105 pixels, up to tens of thousands of grid cells (i.e., pixels) may be available for testing prefetch performance based on mouse movements relative to those test cells. Any size of grid or number of grid cells may be used for testing prefetch performance. A distribution of the mouse movement patterns within the grid may be indicative of prefetch prediction accuracy. For example, a higher distribution of movement within a smaller concentration of the grid may be indicative of a higher likelihood that a page request may be made and that a prefetch may be successful.

Figure 21:
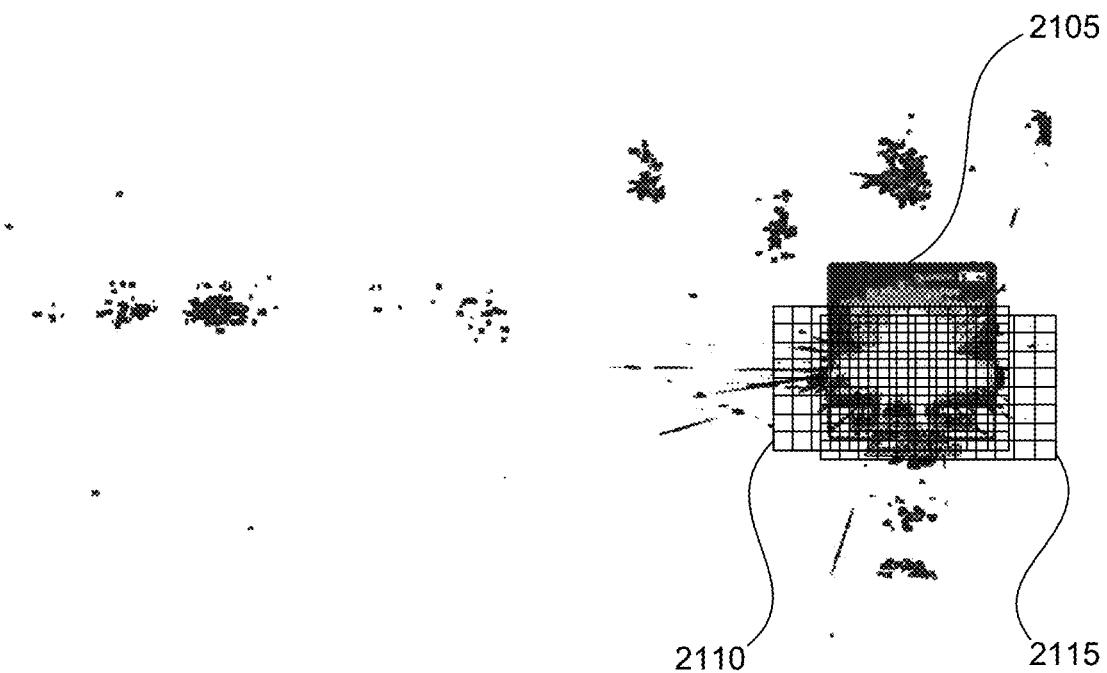
FIG. 21 illustrates variation in the configuration of the prefetch area of FIG. 20 to identify an optimized configuration in accordance with an example of the present technology.

FIG. 21 illustrates the grid pattern 2110, 2115 positioned in multiple different positions over the purchase interface 2105 to accompany the example analysis provided in Table 1 below, where such analysis and modification of the prefetch area may be performed by a machine learner making small changes to the prefetch area.

In Table 1, variations in the degree of offset from a left and top of an original position of the grid pattern may affect an accuracy of prefetch predictions. Similarly, width, height, and other factors of the prefetch area may affect an accuracy of prefetch predictions. Based on Table 1, a greater number of clicks or page requests were predicted at 1 and 3 seconds away from the click than at 2 or 4 seconds prior to the click. If, for example, 85% accuracy is a sufficient threshold for a satisfactory performance of the prefetch area conditions, then each of the conditions in Table 1 may be satisfactory. By performing any desired number of iterations of testing, an increased predicted accuracy may be identified for implementation, at least when such configuration, prediction and/or prefetching does not consume more than a predetermined amount of resources.

TABLE 1

| Offset Top | Offset Left | Width | Height | Speed | Total BuyNow Clicks | Clicks at 1 sec. | Clicks at 2 sec. | Clicks at 3 sec. | Clicks at 4 sec. | % Predicted |
|---|---|---|---|---|---|---|---|---|---|---|
| −40 | −80 | 170 | 110 | 2000 | 7682 | 1892 | 1477 | 2153 | 1294 | 88.7% |
| −40 | −80 | 150 | 110 | 2000 | 7682 | 1927 | 1494 | 2131 | 1247 | 88.5% |
| −35 | −78 | 150 | 105 | 2000 | 7682 | 1948 | 1494 | 2128 | 1218 | 88.4% |
| −35 | −78 | 150 | 105 | 2000 | 7682 | 1948 | 1494 | 2128 | 1218 | 88.4% |
| −35 | −78 | 150 | 105 | 1500 | 7682 | 1950 | 1489 | 2124 | 1218 | 88.3% |
| −35 | −78 | 150 | 105 | 1000 | 7682 | 1948 | 1461 | 2127 | 1206 | 87.8% |
| −35 | −78 | 150 | 105 | 500 | 7682 | 1904 | 1408 | 2077 | 1162 | 85.3% |

Experimentation with various parameters may support a conclusion that a balance between the number of prefetch areas used in a page and the interval before a request at which prefetching begins may result in optimal prefetching. For example, a greater number of prefetch areas per page may encounter a greater number of scaling issues and involvement of a higher computing cost (e.g., in terms of processor time and power) than use of a smaller number of prefetch areas. Also, while setting short intervals of time preceding the request (e.g., performing a prefetch at one or two seconds before a page request) may increase accuracy of prefetch predictions as shown in Table 1, short intervals may also result in increased latency because insufficient time is available to pre-compute the operation. Longer intervals (e.g., prefetches performed at three or four seconds before a page request) may result in less accurate prefetches with reduced latency because of the additional time to load a resource. In some examples, prefetching at the longer intervals may result in some additional latency compared with prefetches at shorter intervals for recalculating aspects of the request when finalizing the request and may also present issues related to inventory.

Prefetched or precomputed data or operations may be cached for a predetermined period of time, as has been described. Certain operations, such as a "Buy Now" page request, if prefetched, may thus cache the inventory to reserve the product for the user for the predetermined period of time. During this period of time, the system may not re-verify availability of the product or other inventory item, either because the item is reserved or because the time period is short enough that depletion of inventory during the time period is negligible. However, a determination may be made as to whether depletion of inventory is a valid concern for prefetched order requests. Experimental data suggests that for a given product, a small percentage of purchases of the same product may occur within a defined period of time. For example, approximately 0.04% of orders may relate to purchases of a same product within 10 seconds of one another. Thus, if the prefetched data is cached for any amount of time up to 10 seconds, a number of orders for the product exposed to a potential inventory issue may be on the order of approximately 80 to 400 orders per one million orders. Because the issue is merely a potential issue which affects a very small proportion of the total orders for a particular product, an assumption may be made that a risk of inventory issues when prefetching purchase overhead and related network pages may be minimal and negligible.

When using the present technology in combination with limited time promotions that may run on a page, behavior of mouse movements relative to the promotions may be transient as compared with portions of the page which are available for a longer period of time. As a result, prefetch predictions for promotions may be difficult. The hard boundary described previously within which mouse movements result in prefetching of network resources may be useful with promotions and the hard boundary may be a smaller or more well-defined prefetch area than may be used for other more lasting elements of a page for which better data and predictions may be provided.

The present technology includes systems and methods for using mouse movements and other user interactions on a network page to infer a user's intent. There is a balance between prefetching the next page after every movement (to provide the best customer latency) and prefetching as little as possible (to reduce calculation overhead on the server).

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for resource prefetch area optimization, comprising:
    a processor;
    a memory in electronic communication with the processor; and
    instructions stored in the memory, the instructions being executable by the processor to operate as:
        a server for providing pages for display;
        an interaction detection module on the server to detect user interaction with a first page within a prefetch area of the first page, the prefetch area being associated with a selectable item on the first page;
        a resource prefetch module to prefetch a second page linked on the first page by the selectable item based on the user interaction within the prefetch area detected by the detection module; and
        a prefetch optimization module to modify the prefetch area to create a modified prefetch area associated with the selectable item, wherein the prefetch optimization module modifies the prefetch area by changing a shape of the prefetch area from a first shape to a second shape different from the first shape.

2. The system of claim 1, wherein the first shape or the second shape of the prefetch area comprises a plurality of irregular shapes.

3. The system of claim 1, wherein the interaction comprises movement of a cursor with respect to the prefetch area.

4. The system of claim 1, wherein the instructions are executable by the processor to further: operate as a latency data store to store a latency of a second page load time for the prefetch area and for the modified prefetch area for comparison; and discard one of the prefetch area or the modified prefetch area based on the comparison.

5. The system of claim 1, further comprising a false prefetch data store in the memory to track a number of false prefetches for the prefetch area and for the modified prefetch area for comparison.

6. The system of claim 1, further comprising:
    a latency data store to store a latency of a second page load time for the prefetch area and for the modified prefetch area for comparison;
    a false prefetch tracking data store to track a number of false prefetches for the modified prefetch area; and a prefetch testing module to test the prefetch area and the modified prefetch area, wherein the prefetch testing module discards the modified prefetch area when
  the latency of the second page load time for the modified prefetch area is greater than for the prefetch area; or
  the number of false prefetches for the modified prefetch area exceeds a predetermined threshold number of missing prefetches.

7. A method for optimizing page prefetch criteria, comprising:
  identifying first prefetch criteria for a selectable item, the first prefetch criteria being associated with the selectable item;
  modifying, using a processor, one or more parameters within the first prefetch criteria to establish second prefetch criteria that is different than the first prefetch criteria, wherein modifying the one or more parameters comprises changing a shape of a prefetch area from a first shape to a second shape different from the first shape; and
  replacing the first prefetch criteria with the second prefetch criteria.

8. The method of claim 7, wherein the selectable item comprises a link to a resource selected from at least one of a page, a video clip, an audio clip, a process, or a document.

9. The method of claim 8, further comprising tracking an accuracy of prefetching the resource based on whether the selectable item is selected.

10. The method of claim 7, wherein modifying the one or more parameters comprises modifying one or more parameters that specify a degree of user interaction with respect to the selectable item.

11. The method of claim 7, wherein the one or more parameters comprise at least one of: timing of user interaction, actions resulting in a user selecting the selectable item, user interactions with the selectable item, or pixels or other display units or display areas used as identifiers or boundaries for the first shape or the second shape.

12. The method of claim 7, wherein at least one of the first shape or the second shape comprises a plurality of irregular shapes.

13. A method for optimizing resource prefetch criteria, comprising:
  identifying a first prefetch area associated with a selectable item on a page;
  tracking, using a processor, first user interaction by a plurality of users with respect to the first prefetch area;
  prefetching a network resource based on the first user interaction by the plurality of users being within the first prefetch area;
  modifying the first prefetch area to obtain a second prefetch area by changing a shape of the first prefetch area from a first shape to a second shape different from the first shape;
  prefetching the network resource based on second user interaction by the plurality of users within the second prefetch area; and
  comparing prefetching efficiency of the first prefetch area and the second prefetch area; and
  discarding a less efficient one of the first prefetch area or the second prefetch area.

14. The method of claim 13, wherein at least one of the first prefetch area or the second prefetch area comprises a plurality of discrete shapes.

15. The method of claim 14, wherein the plurality of discrete shapes are irregular shapes.

16. The method of claim 13, wherein the first user interaction or the second user interaction comprises movement of a cursor, wherein the movement comprises a trajectory, velocity, acceleration, or hold time which is used to determine whether to prefetch the network resource.

17. The method of claim 13, further comprising storing a latency of a network resource load time for the first prefetch area and for the second prefetch area for comparing the prefetching efficiency.

18. The method of claim 17, further comprising discarding the first prefetch area when the latency of the network resource load time for the first prefetch area is greater than for the second prefetch area.

19. The method of claim 13, further comprising tracking a number of false prefetches for the first prefetch area and for the second prefetch area.

20. The method of claim 19, further comprising discarding the first prefetch area when the number of false prefetches for the first prefetch area is greater than for the second prefetch area.

* * * * *